United States Patent [19]
Husseiny et al.

[11] Patent Number: 5,519,809
[45] Date of Patent: May 21, 1996

[54] SYSTEM AND METHOD FOR DISPLAYING GEOGRAPHICAL INFORMATION

[75] Inventors: Abdo A. Husseiny, LaPlace; Jane Y. Murdock, New Orleans, both of La.; Nancy G. O'Brien, Trenton, Mich.; Edwin D. Stevens, New Orleans, La.

[73] Assignee: Technology International Incorporated, LaPlace, La.

[21] Appl. No.: 448,112

[22] Filed: May 22, 1995

Related U.S. Application Data

[63] Continuation of Ser. No. 966,830, Oct. 27, 1992, abandoned.

[51] Int. Cl.⁶ .................................................. G10L 9/00
[52] U.S. Cl. .................. 395/2.84; 395/2.79; 362/363; 362/809; 434/131; 434/126; 434/145
[58] Field of Search ........................ 395/2, 2.79, 2.81, 395/2.84; 362/809, 363; 434/131, 136, 139, 141, 145, 146, 147, 149, 153, 286, 287, 288, 289, 344; 340/995

[56] References Cited

U.S. PATENT DOCUMENTS

| | | | |
|---|---|---|---|
| 2,957,252 | 10/1960 | Pain | 434/136 |
| 3,736,411 | 5/1973 | Berndt | 395/135 |
| 3,974,577 | 8/1976 | Brachlianoff | 434/136 |
| 4,276,561 | 6/1981 | Friedman | 358/524 |
| 4,334,867 | 6/1982 | Friedman | 434/145 |
| 4,449,941 | 5/1984 | McGuire et al. | 434/153 |
| 4,451,874 | 5/1984 | Friedman | 362/285 |
| 4,569,019 | 2/1986 | DiOrio et al. | 364/410 |
| 4,593,403 | 6/1986 | Kishi et al. | 381/43 |
| 4,638,451 | 1/1987 | Hester et al. | 395/275 |
| 4,641,342 | 2/1987 | Watanabe et al. | 381/41 |
| 4,677,569 | 6/1987 | Nakano et al. | 395/2.84 |
| 4,713,766 | 12/1987 | Kobayashi et al. | 364/431.05 |
| 4,717,364 | 1/1988 | Furukawa | 446/175 |
| 4,725,956 | 2/1988 | Jenkins | 364/434 |
| 4,742,456 | 5/1988 | Kamena | 364/400 |
| 4,757,542 | 7/1988 | Neahr, II et al. | 381/51 |
| 4,766,529 | 8/1988 | Nakano et al. | 395/2.84 |
| 4,776,016 | 10/1988 | Hansen | 381/51 |
| 4,785,408 | 11/1988 | Britton et al. | 395/2.79 |
| 4,797,924 | 1/1989 | Schnars et al. | 381/43 |
| 4,797,927 | 1/1989 | Schaire | 381/42 |
| 4,907,274 | 3/1990 | Nomura et al. | 395/2.79 |
| 4,931,950 | 6/1990 | Isle et al. | 395/11 |
| 4,941,082 | 7/1990 | Pailthorp et al. | 364/167.01 |
| 4,978,302 | 12/1990 | Clossey | 434/153 |
| 5,024,523 | 6/1991 | Jerie | 340/995 |
| 5,030,100 | 7/1991 | Hilderman | 434/146 |
| 5,050,056 | 9/1991 | Ellison | 362/300 |
| 5,057,024 | 10/1991 | Sprott et al. | 362/809 |
| 5,115,399 | 5/1992 | Nimura et al. | 364/449 |
| 5,161,886 | 11/1992 | De Jong et al. | 340/995 |
| 5,197,009 | 3/1993 | Hoffman, Jr. et al. | 364/443 |
| 5,226,725 | 7/1993 | Trusiani | 434/145 |
| 5,324,224 | 6/1994 | Anderson et al. | 362/809 |
| 5,344,325 | 9/1994 | Wang | 434/228 |

*Primary Examiner*—Allen R. MacDonald
*Assistant Examiner*—Michael A. Sartori
*Attorney, Agent, or Firm*—Sixbey, Friedman, Leedom & Ferguson; Gerald J. Ferguson, Jr.; Evan R. Smith

[57] ABSTRACT

A computer-aided geographic system highlights a specified area of a map based on operator input. In a preferred embodiment, a voice recognition system receives the operator input in voice form and determines the area to be highlighted. In the preferred form, the map used is a globe, and computerized controls turn and tilt the globe in response to the voice command so that one or more spotlights inside the globe illuminate the area of interest. Information related to the geographic location selected may be retrieved and simultaneously displayed on a computer monitor, video screen, slide screen, and/or narrated by synthesized voice.

35 Claims, 5 Drawing Sheets

SYSTEM AND METHOD FOR DISPLAYING GEOGRAPHICAL INFORMATION

This application is a Continuation of Ser. No. 07/966,830, filed Oct. 27, 1992, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

FIELD OF THE INVENTION

The present invention relates to a voice-interactive computer-controlled system wherein a specific location of a city or a geographical region is localized on a world globe and illuminated upon voice requests. The voice input also prompts an audio-visual display of related information on a computer monitor or a projection screen with a narrated display of still pictures or brief movie captions of scenes from the city and geographical region.

BACKGROUND OF THE INVENTION

A recent Gallup poll of eight nations revealed that 75% of Americans polled could not find the Persian Gulf on an outline map and that over half could not locate Great Britain (*GENIP News*, 1989). Americans ranked a poor sixth out of the eight nations surveyed. Furthermore, there is evidence that the problem is getting worse. In 1984, 2,200 North Carolina college students responded to the same questions posed in a 1950 *New York Times* survey. When asked if they could name the country where the Amazon River is mainly found, only 72% responded correctly in 1984 compared to 78% in 1950. When asked where Manila was located, accurate responses declined from 85% in 1950 to 27% in 1984. Surveys documenting the extent of American geographic illiteracy are commonplace in scholarly journals and many newspapers. A January, 1987, survey of 5,000 high school seniors in eight major American cities revealed that 45% of the Baltimore students could not locate the United States on a map and 25% of the students in Dallas could not name the country that borders us on the south! Kilpatrick (1987) commented, "Students don't protest over Vietnam now— they don't even know where it is."

American geographic illiteracy is not only a political problem, it is an increasingly costly economic problem. It is no coincidence that our worldwide economic competitiveness and, ultimately, our standard of living, have declined hand-in-hand with our geographical knowledge. American economy is now highly dependent on foreign sales abroad and foreign investments at home. Foreign trade generates over half of the sales and profits of Fortune 500 companies and American farmers export 40% of their products (Clawson, in press). As Mylle H. Bell, Director of Corporate Planning for Bell South Corporation noted, "A big part of what is now missing in American education is a fundamental understanding of who fits where in the world . . . physically and culturally. Without this essential first stepping stone, it is very hard to go very far in pursuit of international commerce, no matter how good one's wares might be" (*GENIP News*, 1988).

Educators and others see American geographic illiteracy as one of extreme urgency. So much so that the National Geographic Society promoted "National Geography Awareness Week" Nov. 12–18, 1989. Individual and national well being are affected by geographic ignorance.

Individuals at any level of education have difficulty locating places on a map, especially if the place happens to be in a foreign country or in an area far outside of a given individual's circle of activities. Successfully locating a place on a map or a globe does not necessarily provide the ability to associate the place at a later date with a geographical location or a country unless associated information is given which provides future cues to remind the individual of the place.

Average or below average students often have great difficulty learning geography. Even students who are excellent in geography quickly forget memorized names of major cities and countries unless they are used frequently.

Furthermore, business promoters for a specific locality are limited by brief and, often, unsatisfactory television spots or pamphlets. They need new and unique ways to relay information about their locality to attract prospective investors or outside business people.

Also, existing narrated audio-visual presentations for self-paced studies and training courses, which play a vital role in learning, rely on synchronized, sequential presentation of audio and visual means. It is awkward for a speaker to manually control the audio-visual displays associated with the presentation or rely on someone else to assist him or her. This often leads to confusion and distracts from the course of the presentation.

As far as the inventor is aware, the prior art does not provide a system and method for displaying geographic information like the system and method herein disclosed. Prior U.S. patents do show systems which operate in response to voice commands. For example, U.S. Pat. No. 4,641,342 relates to a voice input system for a voice recognizer circuit wherein a cue signal is issued to the user to indicate system readiness. A voice detector detects the presence of a voice signal. Control circuitry determines if a voice is detected prior to the end of the initial cue signal. If so, this causes a second cue signal to be issued, thereby preventing a loss of voice input. The voice detector can also be used to selectively switch from an active one of plural user channels to one of a similar number of voice recognizers. However, the disclosed system does not teach the art of effectively controlling a system that interfaces with the voice input device.

U.S. Pat. No. 4,776,016 discloses a voice control system which is designed to be adaptable to existing computers so that the existing computers may be operated by voice commands. In the preferred embodiment, the invention is connected into the existing keyboard control means and the computer itself with the system. Software controls a priority switch, giving the keyboard priority over voice entries so that the keyboard may still be used even with the invention connected into the circuit. In the preferred embodiment, voice commands are used so that the existing hardware with existing software incorporated therewith, may be effectively operated in a foolproof manner. However, the disclosure does not teach the art of controlling devices connected to the computer.

U.S. Pat. No. 4,742,456 shows a microprocessor for deenergizing the air and water pumps for a whirlpool bath to reduce background noise when a voice communication system is activated from the bath. A stereophonic sound system can also be incorporated in the bath tub control circuit in the same manner. A carrier current control responds to the microprocessor by sending control signals from the bath tub control circuit through the household electrical wiring circuit to regulate other functions, of which heat lamp, room illumination and door unlocking are typical.

U.S. Pat. No. 4,725,956 discloses an air vehicle control system piloted by remote voice commands. A voice recognizer converts spoken commands into machine compatible control signals which are transmitted to the vehicle. Particular verbal commands are selected for use with said voice recognizer to increase the acceptance probability of the spoken command by the system.

U.S. Pat. No. 4,717,364 shows a voice actuated toy robot which receives commands via a radio transmitter and receiver. In response to these commands, it propagates a signal through a CPU. Initially, the toy is programmed by storing records of commands in a memory which is associated with the CPU. Upon further receipt of identical commands, the CPU scans the memory and upon finding a match between a record in the memory and a new command, the CPU activates a switch associated with the record in the memory so as to set the switch. A mechanical interrogator is capable of cyclically interrogating a plurality of switches each of which corresponds to one of the records in the memory. Upon such interrogation, if it is determined a signal is present at one of the switches, the interrogator ceases interrogation and a mechanism is set so as to propagate motion from a motor to an appendage driving wheel or the like of the robot to produce an output in response to the audio command which was received.

U.S. Pat. No. 4,797,927 shows a voice recognition system which digitizes sequentially spoken words forming a vocabulary. As each word is spoken during an initializing phase, its digital value forms a score which corresponds directly to an address in memory. During a later voice recognition phase, any word spoken is scored and the word is read from an indirectly addressed memory without the necessity of comparisons with the data stored in each memory location.

U.S. Pat. No. 4,797,924 discloses a voice actuated control system for a motor vehicle. A microphone mounted to a vehicle senses user commands as well as other noise in the passenger compartment. Analog electrical signals from the microphone are converted into digital form and compared by a high speed microprocessor with a user profile. A correspondence between the profile and the sensed input causes a control function (e.g., raising or lowering a window) to be performed. A speech synthesizer in the system prompts the user in the event a command in a command sequence is inappropriate.

U.S. Pat. No. 4,785,408 discloses a user-application program for computerized telephone ordering. It is generated by a system designer who selects and interconnects pre-defined program modules and subroutines using a graphics terminal. The application program allows TOUCH TONE input data and voice response. The invention describes a Dialog Production System (DPS) for generating application programs for instructing a computer-controlled voice response system to provide computer-controlled voice services. The DPS includes interaction modules, each defining a basic end-user transaction, which can be performed by the system, and methods for specifying module interconnection. Each interaction module controls the intercommunication with other modules and the devices which interface to the system. To design a dialog program to implement the desired voice service, the system designer uses a graphic terminal to select and interconnect the modules that define the sequence of transactions needed.

U.S. Pat. No, 4,766,529 and U.S. Pat. No. 4,677,569 relate to a computer controlled by voice input. It has a speech recognition section for converting a key word of a program, which is entered by the voice input and corresponds to a start number, thereby obtaining a digital code. The digital code date, which indicate the key word, select the start number corresponding to the storage content of a table stored in a program memory. The start number data are used to access a start address of the corresponding program, thereby starting and executing the program. Also disclosed is a system wherein when a chosen key of a key input device is operated while a voice operator guidance is generated, a key-in signals is produced to forcibly stop the ongoing guidance. In particular, when a plurality of voice operator guidances are provided, the computer learns the state of the operation by the operator from the manner of the forcible stop, and automatically stops the generation of the voice guidance on a specific item from the next processing.

U.S. Pat. No. 4,757,542 shows a speech synthesizer control circuit for use in a vehicle. The circuit includes a number of features which provide cost effectiveness while maintaining speech synthesizer reliability. One feature of the invention is use of a counter circuit interposed between a control circuit and memory where messages are stored. The counter is clocked by the controller to create an address within the memory for a particular message. Other features of the invention include controlling speech volume, chime generation, and voltage protocols in the speech synthesizer control circuit.

U.S. Pat. No. 4,713,766 relates to a system for simultaneously coding and decoding a plurality of signals. In a multi-channel system, a transmitting encoder includes an adaptive quantatizer for each channel, an adaptive bit-allocator using an update algorithm common to all channels, and multiplexer which rearranges signals responsive to bit-allocation information which, in turn, is not transmitted. At the receiving decoder, bit-allocation information is recovered by logic using the transmitter update algorithm. Four embodiments are disclosed.

U.S. Pat. No. 4,638,451 shows a microprocessor system including a CPU device with on-chip or off-chip memory, and data and control busses for accessing memory and/or peripherals. The peripheral circuitry includes one or more channels for input and/or output if data, wherein various characteristics of the treatment of data in the channel are controlled by the program being executed in the CPU. In one embodiment, analog input and output channels are included, and the A-to-D or D-to-A conversion rates are selected by executing a data output instruction by the CPU. The cut-off points of the filters are likewise selected. The A-to-D converter loads a first-in first-out memory which is read by the CPU in burst when filled. Likewise, the CPU loads digital data to a first-in first-out memory in the output channel, and then the D-to-A converts at its selected rate.

U.S. Pat. No. 4,593,403 relates to a speech recognition system for an automotive vehicle which sequentially activates at least one device having plural different operating modes in accordance with a plurality of spoken instructions without repeating the same phrase. To adjust fender mirrors, for instance, first the driver says (delta) Mirror while depressing a recognition switch to stop the moving mirror; second the driver says (delta) Right, horizontally, third the driver says (delta) Stop. The speech recognition system comprises a reset switch, at least one device instruction phrase memory, plural operation-mode instruction phrase memories, and a reference pattern memory selector for selecting the device memory or an appropriate operation-mode memory, in addition to or in place of a section of a conventional speech recognizer.

U.S. Pat. No. 4,569,019 relates to programmable I/O (input/output) interface circuitry and provides video and audio signals, needed for a video computer/game, to a commercial color television type display/monitor and may be implemented in HMOS large-scale-integrated circuitry. The system architecture allows for reduced chip count, and improved reliability while providing signals, chrominance phase shift signals, raster control and cursor control video and three independently controlled audio voices. A software selectable keyboard latch input, plural speed processing for faster operation when outside the active display area or during blanking, all system control signals necessary for system operation and three independently controlled interrupt generating timers are also provided.

None of these references provide a voice responsive system which promotes learning by highlighting a geographical location and providing information about that location.

In particular, the cited references do not teach a system of computer-controlled turning and tilting of a globe to illuminate an area or a spot in response to a vocalized name of a city, which simultaneously prompts a display of graphics and data related to the city or geographical location and a voice synthesizer for reading the data, or a system which also controls the display and selection of slides on a slide projector or the review of portion of a videotape prepared for the location. Also, as far as the inventor is aware, the prior art does not teach the random selection of portions of the presentation for review by mixing the audio presentation and visual display or the remote selection of orderly displays.

Accordingly, there is a need for a computer-aided and voice-activated system for visual localization of geographic locations on a globe while reviewing information related to selected localities, whether on a computer monitor or by viewing associated displays. There is also a need for a system which allows hands-free selection of slides, scenes, or video portions during recorded or live presentations.

SUMMARY OF THE INVENTION

A general object of the present invention is to provide a novel and improved system for highlighting a specified geographical feature on a map display in response to a command.

A further object of the present invention is to provide a novel and improved method for highlighting a specified geographical feature on a map display.

Another object of the present invention is to provide a geographic learning system that facilitates teaching geography in schools by using graphic displays along with printed and spoken data and information while showing the geographic location of cities/countries on the world globe or other maps.

Yet another object of the present invention is to provide a voice-responsive geographical display system which highlights particular areas of interest.

A further object of the present invention is to provide an automatic globe which moves and illuminates to highlight a region selected by an operator.

It is also an object of the present invention to provide a system which highlights a selected geographic feature on a permanent map surface and also provides additional audio and/or visual information related to the selected geographic feature.

Another object of the present invention is to provide a system for presenting multimedia information about a selected geographic feature in response to an operator control input, which in a preferred embodiment may be a voice command.

Another object of the present invention is to provide adults with a means to relate geographic locations to other areas in the world on a world globe, associating cities with specific geographic areas such as states, countries, and continents, while providing information of interest which may be educational in nature or directed at promoting special programs.

A further object of the present invention is to provide a system for television newscasters to promote the display of maps or scenes by using voice input which is part of the broadcast.

A further object of the present invention is to provide a means for display of audio-visual aids.

Other objects of the invention will become apparent to those skilled in the art upon review of the specification and drawings in conjunction with the claims.

The present invention broadly relates to a computer-aided geographic system which uses an input to prompt specific displays, movements, and outputs to provide appropriate information. Another aspect of the invention uses voice to control the system and a slide projector or selected portions of a videotape.

In a preferred embodiment, in response to speaking of the name of the city or geographic location, computerized controls turn and tilt the globe so that a spot light illuminates the area of interest (a country, a state, or a continent). Simultaneously, a set of information is displayed on the computer monitor and narrated by synthesized voice. The graphic displays may includes maps or still pictures. Data displays include geographic, demographic, economic, or other information of interest. Voice prompts may also be used to control slide displays of related scenes. Scenes may be picked from a collection of other slides, and may be used to start a video display of moving scenes related to any given location.

The invention provides a system to remedy the embarrassing inability to locate a city on the globe by creating a globe that will respond to speech. For example, if a teacher is using current events to teach students about world affairs, the present invention enhances the lesson considerably by giving the students a clear idea of where Armenia or Azerbaijan are in relation to each other, to Europe, to Asia, and to the world. The same is true for the executive who is listening to the evening news. With this system, the student or the executive could simply say "Armenia" or "Azerbaijan" and the globe spotlights the requested location. Or if a person says "New Orleans", the globe may first light up North America, then the U.S.A., then Louisiana, and finally New Orleans, to place this city in a global perspective. The system disclosed is a motivating, effective, and efficient instructional tool, useful in schools, homes, and business.

DETAILED DESCRIPTION OF THE PREFERRED EMBODIMENTS

Figure 1:
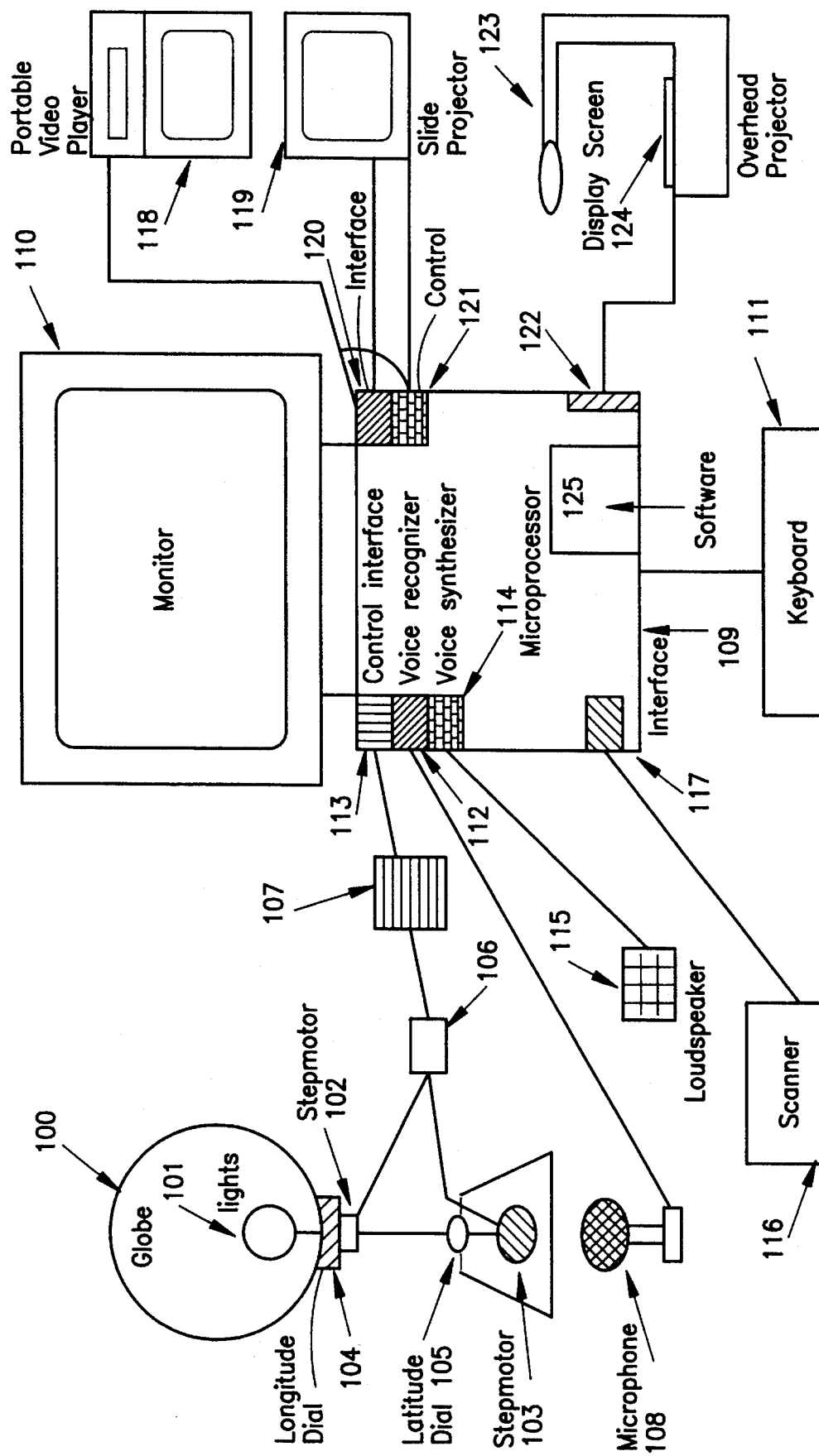
FIG. 1 is a schematic of the voice-interactive, computer-aided geographic system and its components.

FIG. 1 is a block schematic diagram showing a preferred arrangement of the geographic system of the present invention. The basic units are a globe 100, an interior combination of light sources 101, two synchronous step motors 102 and 103, globe dials 104 and 105 for longitude and latitude respectively, a microstep drive 106, a power supply 107, a microphone 108, and a microprocessor system 109 with a monitor 110 and keyboard 111. The microprocessor system contains, in addition to internal disk drives, several cards including a voice recognition card 112, a control interface 113, and a voice synthesizer card 114 connected to a loudspeaker 115. The voice recognition and synthesis function of cards 112 and 114 may be performed by one board such as IntroVoice VI (IBM Compatible) or Micro Intro-Voice (APPLE Macintosh Compatible) available from Voice Connection, Irvine, Calif. The voice recognition functions of card 112 are performed using software associated with card 112 which can be "trained" to recognize desired patterns and provide a character stream output of the word when it is recognized.

Microprocessor system 109 is preferably an IBM Compatible personal computer system having a microprocessor in the Intel 80X86 Series and operating using a Microsoft Windows environment. For example, computers made by Tandy Corporation may be used.

To input graphics or text from a book or any prepared printed materials, a scanner 116, such as a Hewlett Packard ScanJet, is used with an interface 117. A video recorder/player 118 and slide projector 119, with a digitizing interface 120 are provided to input still pictures to the microprocessor system 109.

To display the screens on a video system, digitizing interface 120 can capture images, either graphics or text, and record the image on video recorder/player 121. Digitizing interface 120 may be a Frame Grabber 324 NC made by RasterOps Corp. A controller 122 is used to select the slide and select the portion of a video tape for display. Also, a computer display can be projected by an overhead projector 123 and a conventional data display screen 124 which displays the computer display output on a projector screen instead of or in addition to the monitor.

The data display screen 124 may be a screen made by Computer Accessories or the like; the slide projector 119 may be any carousel projector or may be a portable viewer. Synchronous step motors 102 and 103 may be SLO SYN MDO91FCU9 motors manufactured by the Superior Electric Company. Synchronous step motors 102 and 103 may be obtained, for example, from B & B Motors, Long Island City, N.Y. Step motor 102 rotates the globe according to degrees of longitude as displayed by globe dial 104, and step motor 103 tilts the globe according to degrees of latitude as reflected by dial 105.

Globe 100 may be a Scan Globe 2000 Mark III made by Scan Globe A/S of Denmark. Globe 100 acts as a map display means or a permanent display map device. While Globe 100 is preferably a generally spherical map, a flat or otherwise configured map display could also be used within the spirit of the invention.

Microstep drive 106 may be an MD-10A microstep drive module with 10 microsecond steps/step, and control interface 113 may be a PCX-2 Intelligent Motion Control Firmware Rev. PC 1.21-2, all available from Oregon Microsystems of Beaverton, Oreg. Power supply 107 may be a 30-volt, 4 amp power supply, such as Model SP-2711 made by Heath Schlumberger.

Microphone 108 is preferably a highly direction microphone that incorporates a switch for activating the microphone only when desired, thus preventing unwanted response of the system to ambient noise or conversation.

Portable video player 118 may be a Sony Video Walkman, or Sharp or Casio TC/VCR, or the like.

Software 125 includes software for controlling the motors and activating video and sound devices in response to a user's voice commands. Preferably, software 125 comprises the source code included in the software appendix to this specification.

The software source code provided in the software appendix is a demonstration program which implements the basic functions of the system as disclosed in the specification. Those skilled in the art will recognize that this program can be readily modified to perform additional desired functions, either using custom software modules or commercially available software products. Those skilled in the art will also recognize that this program may be appropriately modified to work with a variety of types of hardware other than the hardware disclosed herein to perform the same functions.

Referring now to the software appendix, five C-language source code modules are provided. The module entitled GAEA.C is the main control program. Module PCXTII.C handles interaction with the motion control board 113. The main program passes desired coordinates to this module to produce rotation of globe 100 and illumination of the desired geographic regions. The module titled SOUND.C provides code for controlling a Tandy Voice Synthesis System. The module titled COMMON.C provides source code for numerous main program functions. Finally, the module titled DEFS.C is a sample database containing the names of states, the latitudes of states, the longitudes of states, text-to-speech synthesis message strings, and message strings for screen display. Conventions are adopted in the system for the assignment of latitudes and longitudes. In the example, north and west are positive, and east and south are negative. However, any desired convention could be adopted.

The software in the software appendix, in the preferred embodiment, operates to receive voice input as a data stream from voice recognition card 112. However, another source of instructions could be provided, such as through keyboard input or through activation timed to coincide with a presentation. Upon receiving voice input from voice recognition card 112, the software identifies the word which was spoken and refers to its programmed database DEFS.C to associate the word with a location. The software then actuates the control motors to rotate globe 100 to the desired position to highlight the specified longitude and latitude associated with the specified geographical location through the database. The program also produces a screen display, which in the example is a text display of information from the database. Additional information may be output by the system under program control, such as graphics displays, slides, taped audio or video output, or other information-conveying output. In this way, the designation of a geographical feature of interest by the operator can initiate a brief multimedia presentation on the geographical feature, including the identification of its location on the globe 100, an audio/visual tape presentation, slides, computer/overhead graphics displays, and synthesized voice narration describing the feature of interest. The information displayed in conjunction with highlighting of the geographical feature will be chosen to provide desired additional information relevant to that feature. The sample program provides a voice synthesized output which conveys information from the database on the specified geographical feature.

Figure 6:
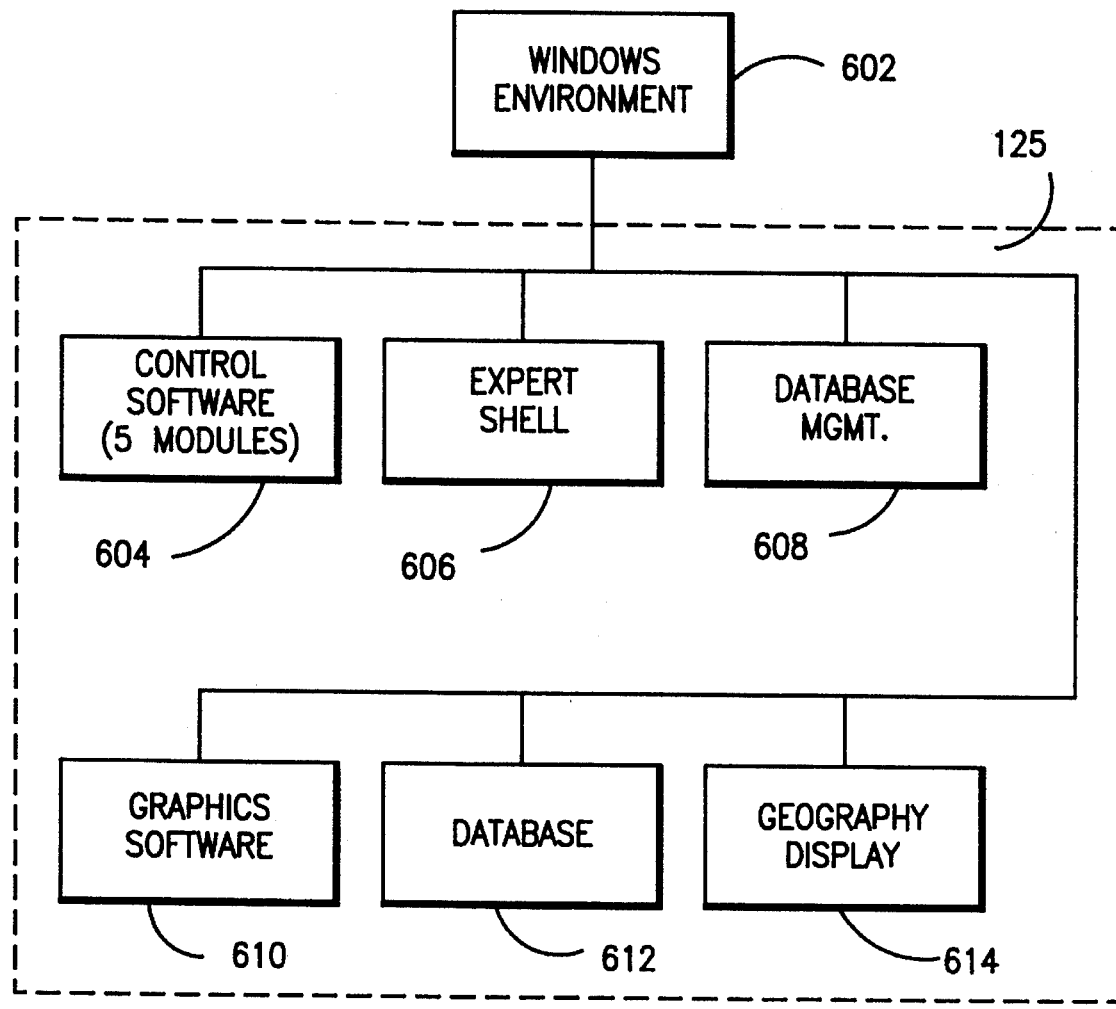
FIG. 6 is a block diagram of an exemplary embodiment of the software shown in FIG. 1.

FIG. 6 is a block diagram showing software 125. As shown in FIG. 6, Windows environment 602 permits communication between a plurality of software packages 125 which operate to coordinate system operation. As described previously, software 125 preferably includes control software, such as the five modules disclosed in the software appendix, shown at 604. Software 125 running in the Windows environment may also optionally include an expert shell 606, such as Knowledge-Pro by Knowledge Gardens, Inc., Nassau, N.Y., to program rules for selecting words for operation. For example, the expert system may process the speech input to compensate for mispronunciation or to select the desired function based on syntax analysis. Database management software 608, graphics software 610 such as Splash or Harvard Graphics, and a database 612 containing information of interest may also be associated with the system and actuated to provide a display of information. Also, geography display software packages 614 may be used in conjunction with the system to display maps on-screen. PC Globe or P.C. U.S.A. by PC Globe Inc., Tempe, Ariz. may be used for this purpose. If these optional packages are used, they will be interfaced together through the Windows environment 602. Optionally, the programs could all be controlled by a main program which would selectively spawn the other programs as sub-processes to produce a desired information display at a specified time in response to voice commands.

Figure 2:
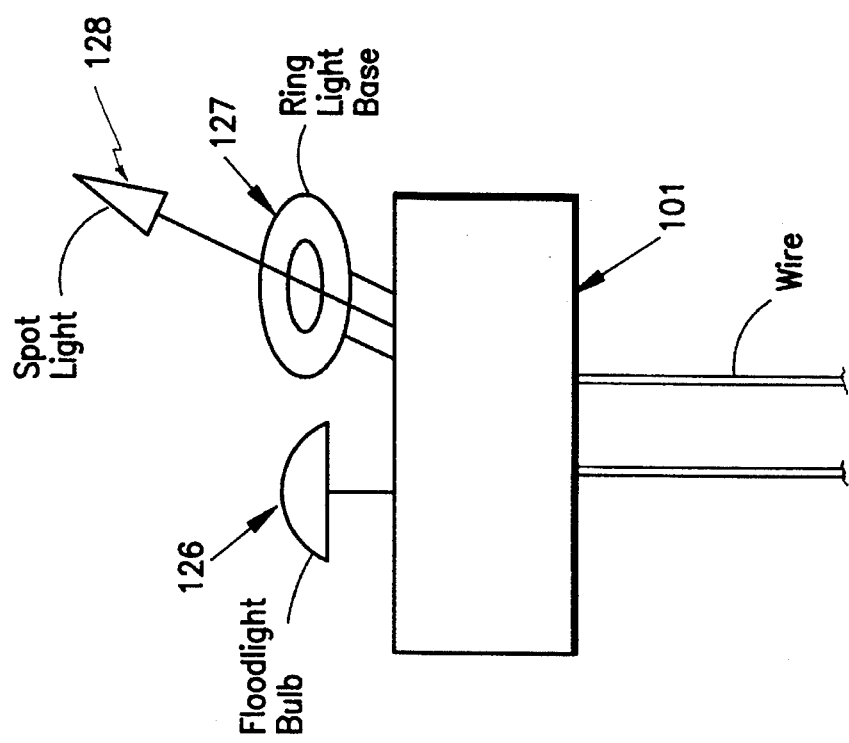
FIG. 2 is a schematic drawing of the lighting arrangement according to the present invention.

Referring now to FIG. 2, light source 101 may include three light sources: a dim flood light 126, a brighter light bulb 127 shining through a ring-shaped aperture, and a sensor spotlight 128. The flood light 126 is used to uniformly illuminate the globe from inside. The ring light 127 illuminates the area around the location of interest and the spot light illuminates a spot location of interest. Preferably, the ring light 127 is fixedly aimed at a location easily visible to viewers of the globe 100, and the region of interest is rotated into the field of illumination of ring light 127 before activation of ring light 127.

However, if desired ring light 127 might have an adjustable position controlled by microprocessor system 109 by means of appropriate positioning motors. Similarly, spotlight 128 may be fixed at a single predetermined location, with globe 100 rotated before activation of spotlight 128 to bring the desired illumination point into the beam of spotlight 128. However, spotlight 128 could also have an adjustable beam aimed under the control of microprocessor system 109 using appropriate control motors. In the preferred embodiment, light source 101 is located inside globe 100, which rotates so that light from floodlight 126, ring light 127, and spotlight 128 can be seen from outside globe 100.

However, if desired, light source 101 or any part thereof, might also be located outside globe 100 and be directed onto its outer surface.

Figure 3:
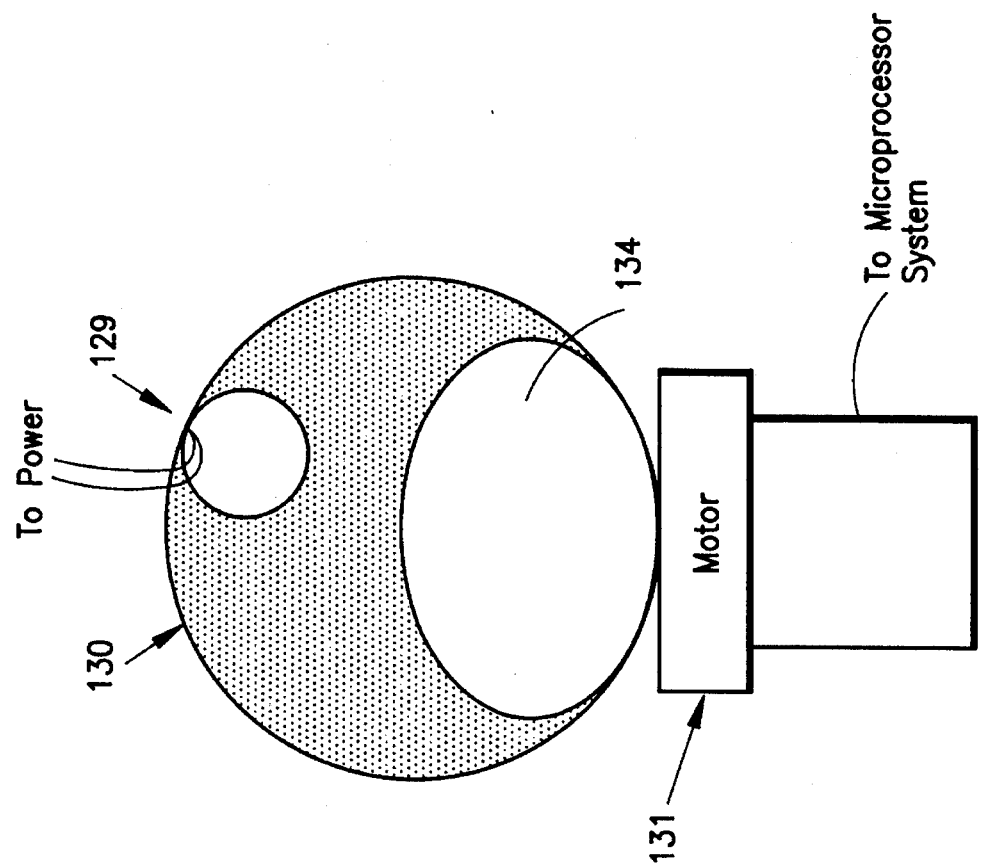
FIG. 3 is an alternative shaded light source for illumination of the geographic region.

An example of an adjustable aim light beam system is shown in FIG. 3. In this embodiment, a light bulb 129 is surrounded by a light shade jacket 130 which can be rotated by a control system 131. Jacket 130 rotates under control of control system 131 connected to microprocessor system 109 to align hole 134 with the region to be illuminated.

Figure 4:
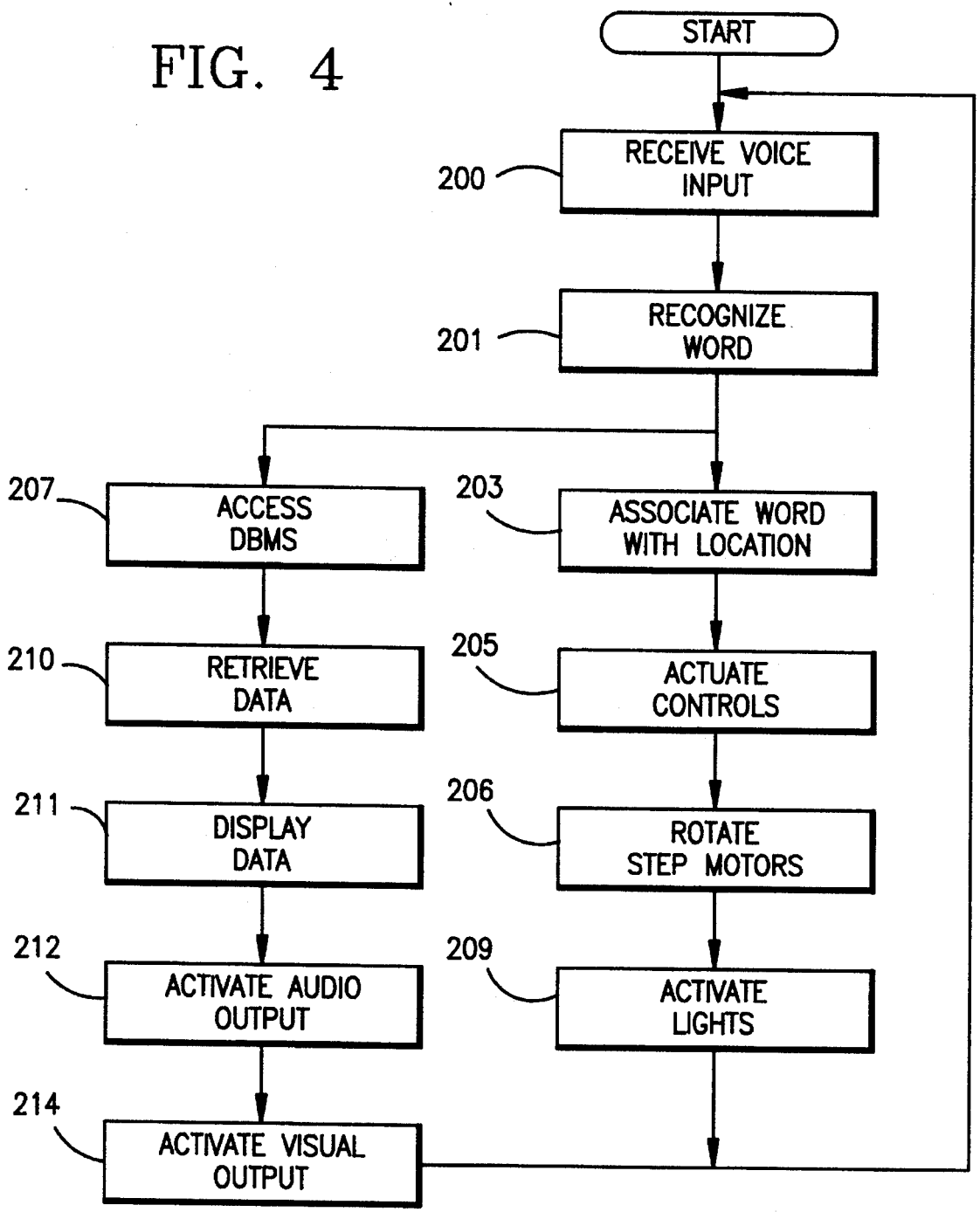
FIG. 4 is a flow chart of the operation of the preferred embodiment.

The operation of the preferred embodiment is depicted by the flow chart shown in FIG. 4. The lights identify a location when asked to do so by uttered words (block 200), saying the name of the city in the microphone or inquiring about a location of interest, such as, "What is the capital of Louisiana?" The voice will prompt the voice recognizer which in turn will recognize the word (block 201). The voice input may optionally be processed in block 203 by expert system software to compensate for mispronunciation or to select the desired function based on syntax analysis. When the desired location has been determined, the coordinates are retrieved in block 203 and the software will then actuate the controls in block 205 to rotate the step motors (block 206) relative to an initial set-up position in order to rotate and tilt the globe and allow the lights to illuminate the location/region requested (block 209). Simultaneously, the system may use the identified location as a key word to a database management system or video graphic display package (block 207) to retrieve related graphics and information (block 210). The information will be displayed on the screen (block 211) and the synthesizer will speak the text on the screen (block 212). The system will send a message to the controller of the video player or the slide projector (block 214) to play or project related scenes. The overhead projector display may substitute for the monitor in the operation of block 211.

Figure 5:
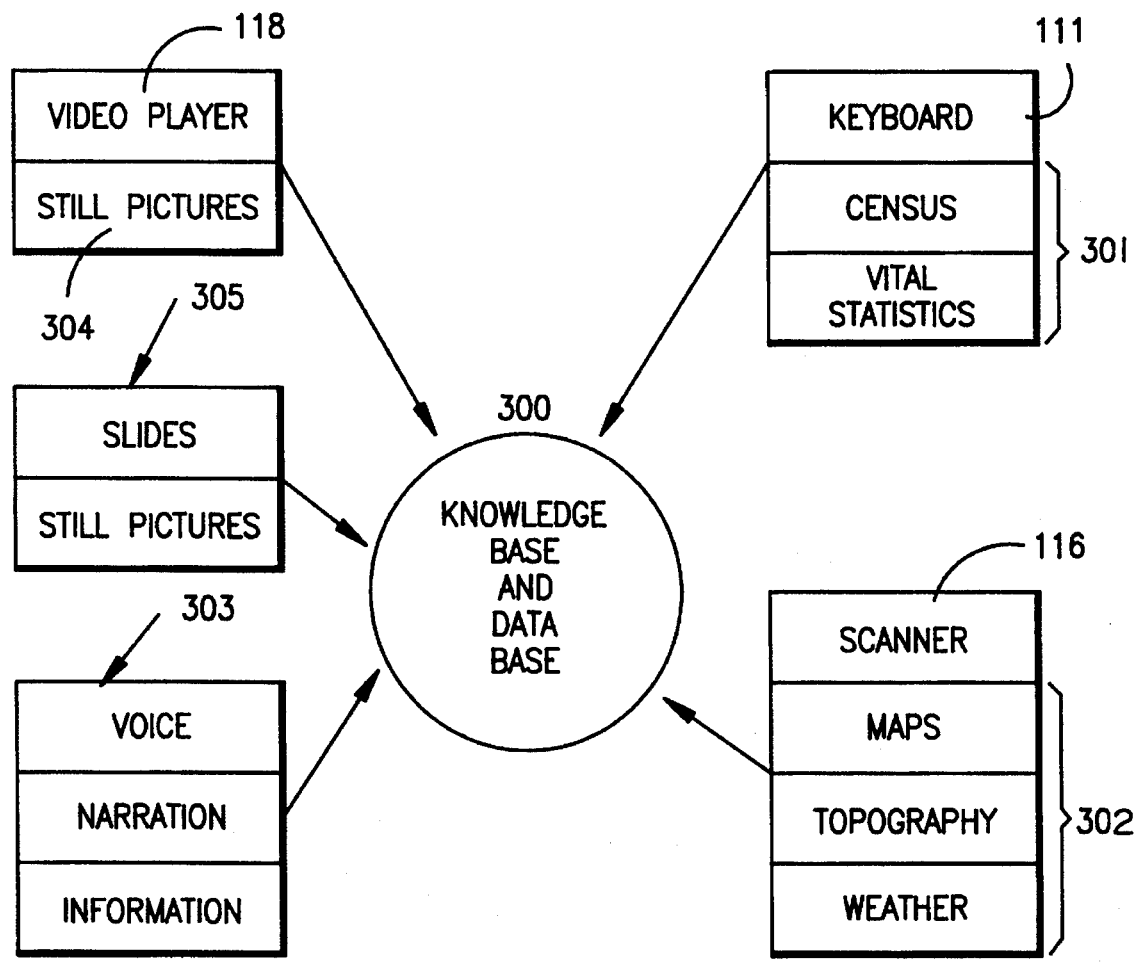
FIG. 5 is an illustration of input for construction of a knowledge base and database.

FIG. 5 shows the components of a preferred knowledge base and database 300. Database 300 is constructed using keyboard input 301, which may provide vital statistics, census data, etc. Scanner input 302 from scanner 116 includes maps, topography, and weather information which are stored for display when the applicable region is specified. Narration and information may be provided in the data base by voice input 303 using, for example, microphone 108 and a sound recording means in the system. Pictures can be stored in digital format, using scanner 116 or by using the digitizing interface 120 described previously to capture still pictures from video player 118 or slide projector 119.

Another embodiment of the invention is a stand-alone globe 100, constructed by integrating the voice synthesizer and recognizer and the controllers in a microchip to be placed on the base of the globe. Both the microphone and the speaker can be embedded in the base architecture. In this simplified configuration, the system preferably identifies places on the globe and provides verbal information output, but does not provide a multimedia description of the regions highlighted.

The stand-alone, voice-activated, and talk-back localizer may be used in unlimited embodiments, including connecting it to a television to display information or playing songs related to given locations. The globe can also be used as a platform for games on cartridges.

SOFTWARE APPENDIX

© Copyright 1992, Technology International Incorporated

```
#include "common.h"                                          COMMON.C

ADAP_STATE display_state;
PAGE_STATE data;
struct videoconfig display_config;

void init_rand( void )
{
   time_t *time_ptr;
   srand( (unsigned) time( time_ptr ) );
} void init_graphics( void )
{
   _scgetvid( &display_state );
   if( _scsavepg( &data ) != SC_NO_ERROR ) {
      printf( "Insufficient memory for page data.\n" );
      exit( 0 );
   }

_getvideoconfig( &display_config );
} void init_sound( void )
{
   set_up_sound( (u_short) 5, (u_short) 0, (u_short) 0, (u_short) 0,
      (u_short) 0 );

set_up_buffers( );
} void activate_page( int page )
{
   _setactivepage( page );
   _scpage( page );
} void display_page( int page )
{
   _setvisualpage( page );
   _scapage( page );
} void present_messages( FILE *fp, char *message_mark )
{
   char line[200],
        sound_file[50];

/* Find the requested message in the messages data file. */
   rewind( fp );
   do
      fread_next_nonempty_line( fp, line, 200 );
   while( strcmp( line, message_mark ) );

/* Present the review message. */
   do {
      fread_next_nonempty_line( fp, line, 200 );
      if( !strcmp( line, "*end*" ) ) break;
      fscanf( fp, "%s", sound_file );
      cls( SC_BLACK );
```

```
      say( line, 2, CLEAR, sound_file );
   } while( TRUE );
} void say( char *printed_words, int row, int clear, char *sound_file )
{
   if( printed_words != NULL )
      message( printed_words, row, clear );
   if( sound_file != NULL ) {
      do_decompress_and_load( sound_file );
      do_playback_sound( );
   }
} void wnsay( char *printed_words, int row, int clear, char *sound_file )
{
   if( printed_words != NULL )
      wnmessage( printed_words, row, clear );
   if( sound_file != NULL ) {
      do_decompress_and_load( sound_file );
      do_playback_sound( );
   }
} void message( char *printed_message, int row, int clear )
{
   static int first_row, last_row, last_col;
   int i, linelength;
   char printline[81], *nextline, *nextspace, *lastspace;

if( clear == CLEAR ) {
      for( i=first_row; i<=last_row; i++ )
         scclrmsg( i, 0, display_config.numtextcols );
      first_row = last_row = row;
      last_col = MARGIN;
   }
   if( row != SAMELINE ) {
      first_row = last_row = row;
      last_col = MARGIN;
   } stpxlate( printed_message, "\t", " " );
   nextline = stpcvt( printed_message, (RLWHITE | RTWHITE | REDUCE) );
   while( TRUE ) {
      sccurset( last_row, last_col );
      linelength = display_config.numtextcols - last_col - MARGIN;
      if( strlen( nextline ) < linelength ) {
         printf( "%s", nextline );
         break;
      }
      lastspace = nextline;
      do {
         nextspace = strchr( lastspace + 1, ' ' );
         if( nextspace == NULL || nextspace - nextline > linelength )
            break;
         lastspace = nextspace;
      } while( TRUE );
      if( i = lastspace - nextline ) {   /* If any characters to print ... */
         strncpy( printline, nextline, i );
         printline[i] = '\0';
         nextline = lastspace + 1;
         printf( "%s", printline );
      }
```

```
        last_row++;
        last_col = MARGIN;
    }
    sccurst( &last_row, &last_col, (int *) NULL, (int *) NULL );
} void wnmessage( char *printed_message, int row, int clear )
{
    static int first_row, last_row, last_col;
    int i, winwidth, linelength;
    char printline[81], *nextline, *nextspace, *lastspace;
    extern BWINDOW *main_win;

winwidth = main_win->view_size.w;
    if( clear == CLEAR ) {
        wnscrblk( main_win, first_row, 0, last_row, winwidth - 1,
            -1, -1, WNSCR_UP, 0, WN_UPDATE );
        first_row = last_row = row;
        last_col = MARGIN;
    }
    if( row != SAMELINE ) {
        first_row = last_row = row;
        last_col = MARGIN;
    } stpxlate( printed_message, "\t", " " );
    nextline = stpcvt( printed_message, (RLWHITE | RTWHITE | REDUCE) );
    while( TRUE ) {
        wncurmov( last_row, last_col );
        linelength = winwidth - last_col - MARGIN;
        if( strlen( nextline ) < linelength ) {
            wnprintf( "%s ", nextline );
            break;
        }
        lastspace = nextline;
        lastspace = nextline;
        do {
            nextspace = strchr( lastspace + 1, ' ' );
            if( nextspace == NULL || nextspace - nextline > linelength )
                break;
            lastspace = nextspace;
        } while( TRUE );
        if( i = lastspace - nextline ) {   /* If any characters to print ... */
            strncpy( printline, nextline, i );
            printline[i] = '\0';
            nextline = lastspace + 1;
            wnprintf( "%s", printline );
        }
        last_row++;
        last_col = MARGIN;
    }
    wncurpos( &last_row, &last_col );
} void wait( float time )
{
    long i, count;

count = (long) (time * 100000L);
    for( i=0; i<count; i++ ) ;
} void wait_and_watch_for_response( float *time, char *response )
```

```
{
   long i, j, count;

count = (long) (*time * 10000L);
   for( i=0; i<10; i++ ) {
      for( j=0; j<count; j++ ) ;
      if( kbhit( ) ) {
         kbflush( );
         get_response( response );
         *time *= (9 - i) * 0.1;
         return;
      }
   }
   response[0] = '\0';
   *time = 0.0;
} void find_file_marker( FILE *fp, char *marker )
{
   char data_line[200];

rewind( fp );
   do
      fread_next_nonempty_line( fp, data_line, 200 );
   while( strcmp( data_line, marker ) );
} int fread_next_nonempty_line( FILE *fp, char *buffer, int max_length )
{
   char *b, *last_buffer_pos;
   int ch;

while( (ch = fgetc (fp)) == '\n' );
   if( ch == EOF )
      return EOF;
   b = buffer;
   last_buffer_pos = buffer + max_length - 1;
   while( ch != '\n' ) {
      if( b >= last_buffer_pos )
         break;
      *b++ = (char) ch;
      if( (ch = fgetc( fp )) == EOF )
         prog_exit( "Unexpected EOF in read_next_nonempty_line.\n" );
   }
   *b = '\0';
   return 1;
} void get_response( char *response )
{
define CR 0x0D char *b, *last_buffer_pos;
   int ch;

b = response;
   last_buffer_pos = response + WORD_LENGTH - 1;

ch = getch( );
   if( ch == 0 )
      ch = getch( ) + 256;
   while( ch != CR ) {
      if( b >= last_buffer_pos )
```

```c
            break;
        if( ch < 256 )
            *b++ = (char) ch;
        ch = getch( );
        if( ch == 0 )
            ch = getch( ) + 256;
    }
    *b = '\0';

if( !stricmp( response, "exit" ) )
        prog_exit( NULL );
} void if_get_response( char *response )
{
define CR 0x0D char *b, *last_buffer_pos;
    int ch;
    int avail, total;

avail = kbqueue( &total );
    if( total == avail ) {
        response[0] = '\0';
        return;
    } b = response;
    last_buffer_pos = response + WORD_LENGTH - 1;

ch = getch( );
    if( ch == 0 )
        ch = getch( ) + 256;
    while( ch != CR ) {
        if( b >= last_buffer_pos )
            break;
        if( ch < 256 )
            *b++ = (char) ch;
        ch = getch( );
        if( ch == 0 )
            ch = getch( ) + 256;
    }
    *b = '\0';

if( !stricmp( response, "exit" ) )
        prog_exit( NULL );
} void cls( int color )
{
    _setcolor( color );
    _clearscreen( _GCLEARSCREEN );
} void prog_exit( char *error_message )
{
    int exit_value;

snd_exit( );

exit_value = ( error_message != NULL ) ? -1 : 0;
    if( scsetvid( &display_state ) ) {
        if( exit_value )
```

```
        printf( "%s", error_message );
    printf( "Unable to restore video state.\n" );
    exit( exit_value );
}
if( screstpg( &data ) != SC_NO_ERROR ) {
    if( exit_value )
        printf( "%s", error_message );
    printf( "Unable to restore display page.\n" );
    exit( exit_value );
}
if( exit_value )
    printf( "%s", error_message );
exit( exit_value );
}
```

SOUND.C
```c
#include <stdio.h>
#include <malloc.h>
#include <stdlib.h>
#include <conio.h>
#include <fcntl.h>
#include <io.h>
#include "common.h"

/*
 *
 *    FUNCTION:   SET_UP_SOUND
 *
 *    Set up for using the sound library, getting the buffers using
 *    far malloc.
 *
 *    nobufs - number of buffers to allocate for sound library use
 *             The minimum value of nobufs is 4 (5 for continuous
 *             play).
 *    trigger - number of buffers to fill before starting playback
 *             (0 for maximum possible buffers)
 *    dma_channel - which dma channel to use.
 *             (u_short) 0 indicates a default.
 *    irq - which interrupt channel to use.
 *             (u_short) 0 indicates a default.
 *    options - various option flags to be passed to snd_init.
 *
 *    See the snd_init() documentation for more info on the last 4
 *    parameters.
 */ void far set_up_sound( u_short nobufs, u_short trigger, u_short dma_channel,
    u_short irq, u_short options )
{
    int bufno;              /* buffers allocated counter */
    int len;                /* appropriate size for buffers */
    char far *cp;           /* pointer to last allocated buffer */
    int ret;                /* snd_init return code */
    char versbuf[100];      /* buffer for version string */
    char far *vp;           /* pointer into version string */

/* find out what size buffer the sound library wants */
    len = snd_addbuf((SOUND far *) 0, (short) 0);

/* loop for however many buffers are needed */
    for( bufno=0; bufno<nobufs; bufno++ ) {
        /* allocate a buffer in far data space */
        cp = _fmalloc( len );
        /* check if allocation was successful */
        if( cp == NULL ) {
            snd_exit( );
            prog_exit( "Cannot allocate sound buffers.\n" );
        }
        /* give the sound library 1 buffer */
        snd_addbuf( cp, (short) 1 );
    }
    /* all the buffers are allocated */

/* initialize the sound library */
    ret = snd_init( trigger, dma_channel, irq, options );
    switch( ret ) {
        case NOERROR:   /* ok */
            return;
        case INITBUF:   /* insufficient buffers */
            prog_exit( "snd_init:  insufficient buffers.\n" );
        case INIT64K:   /* buffers span 64k boundary */
            prog_exit( "snd_init:  all buffers span 64k boundary.\n" );
```

```
        case BADDMA:        /* DMA channel requested is invalid */
            prog_exit( "snd_init: DMA channel requested is invalid.\n" );
        case BADIRQ:        /* IRQ number requested is invalid */
            prog_exit( "snd_init: IRQ number requested is invalid.\n" );
        case NOIRON:        /* Can't find sound hardware */
            prog_exit( "snd_init: Cannot find sound hardware.\n" );
        default:            /* unknown error code */
            prog_exit( "snd_init: unknown error code.\n" );
    }
}

/*
 *  FUNCTION: SET_UP_BUFFERS
 *
 *  This routine allocates as many sets of SNDHDR and SOUND structures,
 *  and memory for the sound data.  It grabs all the memory it can, so
 *  be sure that sound library buffers are already allocated before
 *  calling this routine.
 */

SNDHDR far * sndheaders[MAXBUFFERS];    /* list of SNDHDR structures */
SOUND far * sndstructs[MAXBUFFERS];     /* list of SOUND structures */
int numbuffers = 0;            /* number of buffers actually allocated */ void set_up_buffers( void )
{
    SNDHDR far *shp;
    SOUND far *stp;
    char far *bp;

/*
     * Allocate as many BUFFERSIZE-byte buffers, and associated
     * SNDHDR and SOUND structs, as possible.
     */
    for( numbuffers=0; numbuffers<MAXBUFFERS; numbuffers++ ) {
        bp = (char far *) _fmalloc( (size_t) BUFFERSIZE );
        shp = (SNDHDR far *) _fmalloc( sizeof( SNDHDR ) );
        stp = (SOUND far *) _fmalloc( sizeof( SOUND ) );
        /* check if any allocations failed */
        if( bp == 0 || shp == 0 || stp == 0 ) {
            /* an allocation failed - free any pieces that */
            /* were allocated and can't be used */
            if( bp != 0 )
                _ffree( bp );
            if( shp != 0 )
                _ffree( shp );
            if( stp != 0 )
                _ffree( stp );
            return;
        }
        /* fill in the SNDHDR structure */
        shp->sndp = stp;        /* fill in pointer to SOUND */
        shp->start = 0;         /* fill in start/end */
        shp->end = 0;           /* 0 for both indicates the entire */
                                /* sound should be played */
        shp->rate = R11000;     /* Sampling rate is one of */
                                /* R5500, R11000, or R22000 */

/* fill in SOUND structure */
        stp->buffer = bp;       /* fill in buffer address */
        stp->sndlen = 0;        /* initially no sound recorded */

/* Lie about the buffer size, so there is enough slop */
        /* at the end of the buffer so snd_decompress_part can */
```

```
      /* decompress a full buffer back into the same-sized */
      /* buffer without running off of the end. */
       stp->buflen = BUFFERSIZE - 2;    /* fill in buffer length */

/* save addresses so we remember where they are */
       sndheaders[numbuffers] = shp;
       sndstructs[numbuffers] = stp;
   }
}

/*
 *   FUNCTION:   DO_RECORD_SOUND
 *
 *   This routine records a sound into the memory allocated by
 *   set_up_buffers().
 */ void do_record_sound( void )
{
   int i;
   int prompted = 0;

for( i=0; i<numbuffers; i++ ) {
      /*
       * maxtime = 0 means "record until buffer fills up"
       * rate = R11000; use 11,000 samples/second
       */
      do {
         /* first pass through loop, give instructions */
         if( prompted == 0 ) {
            printf( "Press any key to stop recording\n" );
            prompted = 1;
         }

/* Check for keyboard input, which is considered a */
         /* request to stop recording */
         if( kbhit( ) ) {
            /* stop recording */
            snd_stop( (SNDHDR far *) 0 );
            /* read character and throw it away */
            getch( );
            printf( "Recording stopped by operator request\n" );
            return;
         }
      } while( snd_record( sndstructs[i], 0, R11000,
                  (u_char far *) NULL, FALSE ) == WOULDBLOCK );
   }
   /* wait for recording to finish */
   snd_wait( (SNDHDR far *) 0, (short) 1 );
   printf( "Recording stopped - buffers full\n" );
   return;
}

/*
 *   FUNCTION:   DO_PLAYBACK_SOUND
 *
 *   This routine plays back a sound in the memory allocated by
 *   set_up_buffers() and loaded by something.
 */ void do_playback_sound( void )
{
```

```
    int i;
    SNDHDR far * shp;

/* for each buffer */
    for( i=0; i<numbuffers; i++ )
       shp = sndheaders[i];           /* get SNDHDR struct address */
       if( shp->sndp->sndlen > 0 ) {  /* if there is sound in the buffer */
                     /* play sound at same rate it was recorded */
          shp->rate = shp->sndp->rate;
                     /* start and end in the SNDHDR struct have already */
                     /* been set to zero (play entire buffer) */
          snd_play( shp );
       }
    }
 /* wait for playing to finish */
    snd_wait( (SNDHDR far *) 0, (short) 1 );
    return;
}

/*
 *    FUNCTION:  DO_COMPRESS_AND_SAVE
 *
 *    This routine takes the sound saved in sound buffers allocated by
 *    set_up_buffers(), compresses it, and writes it to a file.
 */ void do_compress_and_save( char *filename )
{
    int fd;                             /* file handle for save file */
    COMPINFO Info;                      /* compress scratch area */
    COMPPARAM Param;                    /* compress parameters */
    int bufno;                          /* index for SOUND buffers */
    unsigned char filebuffer[512];      /* buffer for file writes */
    u_long ret,                         /* return value from compress */
           locpos,                      /* file loc. to write data loc. */
           location,                    /* date loc. to be written at locpos */
           chunklength,                 /* length of compressed data */
           uncomplen,                   /* uncompressed length of sound */
           dummy;
    int rate;
    char header[5], nib[4];

/* set up the compress parameter data */
    Param.pinfo = &Info;       /* scratch area pointer */
    Param.start = 0;           /* do the entire sound */
    Param.end = 0;
    Param.compress_mode = DESKMATE88_ADJUSTABLE;   /* specify parameters */
    Param.precision = 0;       /* exact sound reproduction */
    Param.threshhold = 0;
    Param.threshhold_length = 0;

/* open the save file */
    fd = open( filename, O_WRONLY|O_BINARY|O_CREAT|O_TRUNC, 0666 );
    if( fd < 0 ) {
       snd_exit( );
       sprintf( filebuffer, "Cannot open sound file %s.\n", filename );
       prog_exit( filebuffer );
    } header[0] = 0x1A;
    header[1] = 0x2;
    header[2] = 0x1;
    header[3] = 0x0;
    header[4] = 0x0;
```

```
    if( write( fd, &header, sizeof(header) ) != sizeof(header) )
        snd_exit( );
        prog_exit( "Error writing header to save file.\n" );
    } lseek( fd, 14, SEEK_SET );
    rate = 0;
    switch( sndheaders[0]->sndp->rate ) {
        case  R5500 : rate = 5500;
                      break;
        case R11000 : rate = 11000;
                      break;
        case R22000 : rate = 22000;
                      break;
    }
    if( write( fd, &rate, sizeof(int) ) != sizeof(int) ) {
        snd_exit( );
        prog_exit( "Error writing \"rate\" to save file.\n" );
    } nib[0] = 0xff;
    nib[1] = 0xff;
    nib[2] = 0xff;
    nib[3] = 0xff;
    if( write( fd, &nib, sizeof( nib ) ) != sizeof( nib ) ) {
        snd_exit( );
        prog_exit( "Error writing note information block to save file.\n" );
    } locpos = lseek( fd, (long) 0, SEEK_CUR );
    location = 0L;
    if( write( fd, &location, sizeof(long) ) != sizeof(long) ) {
        snd_exit( );
        prog_exit( "Error writing location to save file.\n" );
    }
    chunklength = 0L;
    if( write( fd, &chunklength, sizeof(long) ) != sizeof(long) ) {
        snd_exit( );
        prog_exit( "Error writing compressed length to save file.\n" );
    }
    dummy = 0L;
    if( write( fd, &dummy, sizeof(long) ) != sizeof(long) ) {
        snd_exit( );
        prog_exit( "Error writing data to save file.\n" );
    }
    uncomplen = 0L;
    if( write( fd, &uncomplen, sizeof(long) ) != sizeof(long) ) ;
        snd_exit( );
        prog_exit( "Error writing actual length to save file.\n" );
    }
    if( write( fd, &dummy, sizeof(long) ) != sizeof(long) ) {
        snd_exit( );
        prog_exit( "Error writing data to save file.\n" );
    }
    if( write( fd, &dummy, sizeof(long) ) != sizeof(long) ) {
        snd_exit( );
        prog_exit( "Error writing data to save file.\n" );
    }
    location = lseek( fd, (long) 0, SEEK_CUR );

/* for each SOUND structure */
    for( bufno=0; bufno<numbuffers; bufno++ ) {
        /* if there is no sound recorded, ignore this SOUND */
        if( sndheaders[bufno]->sndp->sndlen == 0 )
            continue;
        uncomplen += sndheaders[bufno]->sndp->sndlen;
```

```c
    /* compress the sound */
    ret = snd_compress_part( sndheaders[bufno]->sndp,
        (unsigned char far *) filebuffer, (unsigned short) 512,
        CTYPE_DESKMATE88, (COMPPARAM far *) &Param );
    chunklength += ret;

/* write first chunk to file */
    if( write( fd, filebuffer, (unsigned int) ret ) != (int) ret ) {
        snd_exit( );
        prog_exit( "Cannot write save file.\n" );
    }

/* process the rest of the data */
    while( (ret = snd_compress_part( (SOUND far *) 0,
            (unsigned char far *) filebuffer, (unsigned short) 512,
            CTYPE_DESKMATE88, (COMPPARAM far *) &Param )) != 0 ) {
        if( write( fd, filebuffer, (unsigned int) ret ) != (int) ret ) {
            snd_exit( );
            prog_exit( "Cannot write save file.\n" );
        }
        chunklength += ret;
    }
}

/* seek to where the location is written */
if( lseek( fd, locpos, SEEK_SET ) < 0 )
    perror( "lseek to locpos failed" );
if( write( fd, &location, sizeof(long) ) != sizeof(long) ) {
    snd_exit( );
    prog_exit( "Error writing location to save file.\n" );
}
/* write the correct length */
if( write( fd, &chunklength, sizeof(long) ) != sizeof(long) ) {
    snd_exit( );
    prog_exit( "Error writing compressed length to save file.\n" );
}
lseek( fd, sizeof(long), SEEK_CUR );
if( write( fd, &uncomplen, sizeof(long) ) != sizeof(long) ) {
    snd_exit( );
    prog_exit( "Error writing actual length to save file.\n" );
}

/* close the file */
close( fd );
return;
}

/*
 *  FUNCTION:  DO_DECOMPRESS_AND_LOAD
 *
 *  This routine takes the sound saved in a file by do_compress_and_save()
 *  decompresses it, and loads it into the sound buffers allocated by
 *  set_up_buffers().
 */
void do_decompress_and_load( char *filename )
{
    int fd;                            /* file handle for sound file */
    COMPINFO Info;                     /* compress scratch area */
    int bufno;                         /* index for SOUND structures */
    unsigned char filebuffer[512];     /* buffer for file reads */
    u_long complen,                    /* length of compressed data */
           uncomplen,                  /* length of uncompressed data */
```

```
          buflen;                        /* length of sound buffer */
    u_short datalen;                     /* usable data length in filebuffer */
    int firsttime,                       /* first-time-through flag */
        rate;                            /* speed sound was recorded at */
    u_long location,                     /* location of sound data in file */
           ret;                          /* return value from decompress */

/* open the sound file */
    if( (fd = open( filename, O_RDONLY|O_BINARY )) < 0 ) {
        snd_exit( );
        sprintf( filebuffer, "Cannot open sound data file %s\n", filename );
        prog_exit( filebuffer );
    } if( lseek( fd, 14, SEEK_SET ) < 0 )
        perror( "lseek \"rate\" failed" );
    if( read( fd, &rate, sizeof(int) ) != sizeof(int) ) {
        snd_exit( );
        prog_exit( "Reading \"rate\" failed.\n" );
    }
    if( rate == 5500 ) rate = R5500;
    else if( rate == 11000 ) rate = R11000;
    else if( rate == 22000 ) rate = R22000;
    else printf( "Unknown rate %d.\n", rate );

if( lseek( fd, 4, SEEK_CUR ) < 0 )
        perror( "lseek for \"location\" failed" );
    if( read( fd, &location, sizeof(long) ) != sizeof(long) )
        perror( "reading \"location\" failed" );
    if( read( fd, &complen, sizeof(long) ) != sizeof(long) )
        perror( "reading \"complen\" failed" );
    if( lseek( fd, 4, SEEK_CUR ) < 0 )
        perror( "lseek for \"uncomplen\" failed" );
    if( read( fd, &uncomplen, sizeof(long) ) != sizeof(long) )
        perror( "reading \"uncomplen\" failed" );
    if( lseek( fd, location, SEEK_SET ) < 0 )
        perror( "lseek to \"location\" failed" );

/* check for end of file */
    if( complen == 0 ) {
        close( fd );
        return;
    } bufno=0;
    buflen = sndheaders[bufno]->sndp->buflen;
    if( uncomplen + 2 > buflen ) {
        snd_exit( );
        prog_exit( "Buffer unable to hold sound.\n" );
    }
    sndheaders[bufno]->sndp->sndlen = uncomplen;
    sndheaders[bufno]->sndp->rate = rate;

firsttime = 1;
    while( complen > 0 ) {
/* read smaller of remaining data or buffer size */
        datalen = (int) ( (complen < 512) ? complen : 512 );
        if( read( fd, filebuffer, datalen ) != datalen ) {
            snd_exit( );
            prog_exit( "Error reading save file.\n" );
        }
    /* decompress */
        ret = snd_decompress_part( firsttime ?
            (SOUND far *) sndheaders[bufno]->sndp : (SOUND far *) 0,
            (COMPINFO far *) &Info, (u_char far *) filebuffer, datalen );
    /* first time for each compressed chunk, pass the SOUND struct; */
```

```
    /* on subsequent pieces, pass a null pointer */
    if( ret == BADFMT ) {
       snd_exit( );
       prog_exit( "Sound compressed using unsupported algorithm "
                  "(or corrupted)\n" );
    }
    firsttime = 0;

/* subtract off data we just read from total */
    complen -= datalen;
 }
 /* final call to decompress, get last of the data */
 snd_decompress_part( (SOUND far *) 0, (COMPINFO far *)&Info,
       (u_char far *) filebuffer, 0 );

/* close the file */
 close( fd );
 return;
}
```

DEFS.C

```c
#include "globe.h"

char geog_name[NUM_USA][25] = { " ", "Alabama", "Alaska", "Arizona",
    "Arkansas", "California", "Colorado", "Connecticut", "Delaware",
    "Washington, D.C.", "Florida", "Georgia", "Hawaii", "Idaho",
    "Illinois", "Indiana", "Iowa", "Kansas", "Kentucky", "Louisiana",
    "Maine", "Maryland", "Massachusetts", "Michigan", "Minnesota",
    "Mississippi", "Missouri", "Montana", "Nebraska", "Nevada",
    "New Hampshire", "New Jersey", "New Mexico", "New York",
    "North Carolina", "North Dakota", "Ohio", "Oklahoma", "Oregon",
    "Pennsylvania", "Rhode Island", "South Carolina", "South Dakota",
    "Tennessee", "Texas", "Utah", "Vermont", "Virginia", "Washington",
    "West Virginia", "Wisconsin", "Wyoming", "Mexico" };

double latit[NUM_USA] = {      0.0,
     32.5,    68.5,    34.0,    35.5,    35.0,    38.5,    42.0,    39.0,    38.7,
     28.0,    31.0,    22.0,    45.0,    42.0,    41.0,    44.0,    39.0,    38.0,
     30.0,    46.0,    39.0,    43.0,    45.0,    47.0,    33.0,    38.0,    48.0,
     42.5,    39.0,    45.0,    41.0,    35.0,    44.0,    35.5,    50.0,    41.0,
     35.0,    45.0,    41.0,    42.0,    33.0,    46.5,    36.0,    31.0,    39.0,
     45.0,    38.0,    50.0,    39.0,    46.0,    43.5,    20.0  );

double longi[NUM_USA] = {      0.0,
     84.0,   150.0,   111.0,    91.0,   120.0,   105.0,    70.5,    75.0,    75.4,
     80.0,    82.0,   157.0,   114.0,    88.0,    84.0,    93.0,    98.0,    83.0,
     92.0,    67.0,    75.0,    70.0,    83.0,    94.0,    89.0,    92.0,   108.0,
    100.0,   115.0,    68.5,    73.0,   105.0,    74.0,    79.0,    99.0,    81.0,
     97.0,   119.0,    75.0,    68.5,    79.0,   100.0,    86.0,    99.0,   111.0,
     71.0,    77.0,   120.0,    80.0,    89.0,   107.0,   100.0  );

char audio[NUM_USA][200] = { "",
"the twen tee  sec unt state    alebaama      is cauhled the   "
  "heart of  dixie.",
"alahska     the lahst fruntier     was the for tee  nine th state.",
"the for tee  eight th  state     arezoana     is noan as the  "
  "grand  cahnion  state.",
"sum  peaple cauhl  auerkinsau    the laahhnd of  auportunity       "
  "auerkinsau was the twen tee  fif th state.",
"cahlifornia    the goalden state     was the thir dee  first   "
  "in the younion.",
"coluhrauhhdoh    became the thir dee eight th state    in our   "
  "nations  cen tennial year.",
"noan as the con stitooshun  state    or the nuh tmeg  state         "
  "cuhn ehticut     was fif th  in the younion.",
"the fir st state     deh luhwair     is also cauhled the   "
  "die mund  state.",
"waushing tun dee see     is the capital of the united states         "
  "its mauto is       juhstice   for  all.",
"the twen tee  seven th state     flohrida      is known as the "
  "suhn shine state.",
"the peach state    or     empire state of the south       "
  "johhrija  was   for th  in the younion.",
"hawyee     the aloaha state     was the fif tee eth state.",
"the for tee  third state     i  daho     is cauhled the gehn state.",
"ill uhnoi     the prairie state    was twen tee  first  "
  "in the younion.",
"the nine teen th state      indeeahna    is cauhled the hoozhier state.",
"i uhwa     the twen tee  nine th state     is noan as the   "
  "hauk eye state.",
"the thir dee  for th  state     kaahhnsus    is noan as both the  "
  "sun flower state    and   the jay hauk state.",
"the  bluegrass state of kun tucky    was fif teen th in the younion.",
"the great state of  looee zeeana     is also cauhled the   "
  "pehlicun state        looeezeeana was the eight teenth state.",
"mmayn     the twen tee third  state    is the pine tree state.",
"noan as both the  free state      and  the oald  line  state     "
```

```
    "mairih lun dd was the seven th state.",
"the six th state    noan as both the  bay  state      and   the  "
    "oald  cauluhny   is cauhled maahhsuh jchoosets.",
"the  great  lake  state of  mihshihgun     also cauhled the "
    "wuhhllvereen   state     was the twen tee  six th state.",
"the  north star  state    or goaffer state     noan to moast as "
    "mihnuh soatuh    was the thir dee  sec unt state.",
"the twen tee eth state   was  the  magnoal eeuh state  of  "
    "mihs ihs ihpee.",
"the   shoa mee  state     twen tee  for the in the younion      is  "
    "mihzz uhree.",
"mauhn tana    the for tee  fir st state     is noan as the  "
    "treh zjur  state.",
"the  corn  husker  state of  nuh braska     was thir dee   seven th "
    "in the younion.",
"nuh vahda  has mehny names      including the  saje brush  state     "
    "bahtul  born  state     and  sihl ver  state       nuh vahda "
    "was thir dee  six th  in the younion.",
"the grah nut  state    nu  hampshur   has the mauhto of   lihv  "
    "free  or  die    nu hampshur was the nine th state.",
"nu  jurzee   the thir dd state    is cauhled the  gar dun   state.",
"nu  mehxihko   the for tee  seven th state    is also cauhled the  "
    "laahhnd  of  en chahntmunt.",
"the eleh vunth state     nu  york    is also the   ehm pire state.",
"the  tar heel  state    or oald north  state     twelf th  "
    "in the younion    is  north  cair ohlyna.",
"north  duh kotuh    the thir tee  nine th state     is the   peece  "
    "gar dun  state.",
"the buck  eye  state of  oh hyo    was the seven teenth state.",
"the for tee   six th state    oh kluh homuh    is the  soo ner  state.",
"orreihgaun    the  bee ver  state    was the thir dee  thir dd state.",
"pensihlvania    the sec unt state    is the kee stone state.",
"roa dd island    nick named  lihtul  roady    or the  oh shun  "
    "state    was the thir teenth state.",
"the eight th state    nick named the  pall mehtoh  state    is  "
    "south  cair ohlyna.",
"south  duh kotuh    the for tee eth state    is cauhled the  "
    "kie oh tee  state    or  sun shine  state.",
"the  vall uhntier  state of  ten uh see   was the six teenth state.",
"the twen tee  eight th state    cauhled the  loan  star  state      "
    "is  tek sus.",
"yoo  tauh    the for tee  fif th  state    is the  bee hive  state.".
"the  green  moun tun  state of  vvermaun tt  was the  for teenth  "
    "state in the union.",
"the ten th state    oald  doa mihnion  state    is  vverjihnia.",
"waushing tun    the eh vver green  state    was the for tee  "
    "sec unt  state.",
"the thir tee  fif th  state    west  vverjihnia   is cauhled "
    "the  moun tun  state.",
"the bah djer  state    wihs caunsun    was the thir tee eth  state.",
"the ee quallihty  state    for tee  for th  in the younion    "
    "is  wyohming.",
"Mexico is not really a state of the United States."
};

char video[NUM_USA][200] = { "",
"The twenty-second state, Alabama, is called the Heart of Dixie.",
"Alaska, the last frontier, was the forty-ninth state.",
"The forty-eighth state, Arizona, is known as the Grand Canyon State.",
"Some people call Arkansas the Land of Opportunity."
"  Arkansas was the twenty-fifth state.",
"California, the golden state, was the thirty-first in the union.",
"Colorado became the thirty-eighth state in our nation's centennial year.",
"Known as the Constitution State or the Nutmeg State, Connecticut was "
    "fifth in the Union.",
"The first state, Delaware, is also called the Diamond State.",
```

```
"Washington D.C. is the capitol of the United States.  Its motto is "
    "justice for all.",
"The twenty-seventh state, Florida, is known as the Sunshine State.",
"The Peach State or Empire State of the South, Georgia, was fourth "
    "in the Union.",
"Hawaii, the Aloha State, was the fiftieth state.",
"The forty-third state, Idaho, is called the Gem State.",
"Illinois, the Prairie State, was twenty-first in the Union.",
"The nineteenth state Indiana, is called the Hoosier State.",
"Iowa, the twenty-ninth state, is known as the Hawkeye State.",
"The thirty-fourth state, Kansas, is known as both the Sunflower State "
    "and the Jayhawk State.",
"The Bluegrass State of Kentucky was fifteenth in the Union.",
"The great state of Louisiana is also called the Pelican State. "
    "Louisiana was the eighteenth state.",
"Maine, the twenty-third state, is the Pine Tree State.",
"Known as both the Free State and the Old Line State, Maryland was "
    "the seventh state.",
"The sixth state known as both the Bay State and the Old Colony is "
    "called Massachusetts.",
"The Great Lake State of Michigan, also called the Wolverine State "
    "was the twenty-sixth state.",
"The North Star State or Gopher State, known to most as Minnesota, "
    "was the thirty-second state.",
"The twentieth state was the Magnolia State of Mississippi.",
"The Show Me State, twenty-fourth in the Union, is Missouri.",
"Montana, the forty-first state, is known as the Treasure State.",
"The Cornhusker State of Nebraska was thirty-seventh in the Union.",
"Nevada has many names including the Sagebrush State, Battleborn State "
    "and Silver State.  Nevada was thirty-sixth in the Union.",
"The Granite State, New Hampshire, has the motto of \"Live Free or "
    "Die.\"  New Hampshire was the ninth state.",
"New Jersey, the third state, is called the Garden State.",
"New Mexico, the forty-seventh state, is also called the Land of "
    "Enchantment.",
"The eleventh state, New York, is also the Empire State.",
"The Tarheel State or Old North State, twelfth in the Union, is "
    "North Carolina.",
"North Dakota, the thirty-ninth state, is the Peace Garden State.",
"The Buckeye state of Ohio was the seventeenth state.",
"The forty-sixth state, Oklahoma, is the Sooner State.",
"Oregon, the Beaver State, was the thirty-third state.",
"Pennsylvania, the second state, is the Keystone State.",
"Rhode Island, nicknamed Little Rhody or the Ocean State, was the "
    "thirteenth state.",
"The eighth state, nicknamed the Palmetto State, is South Carolina.",
"South Dakota, the fortieth state, is called the  Coyote State or "
    "Sunshine State.",
"The Volunteer State of Tennessee was the sixteenth state.",
"The twenty-eighth state, called the Lone Star State, is Texas.",
"Utah, the forty-fifth state, is the Beehive State.",
"The Green Mountain State of Vermont was the forteenth state "
    "in the Union.",
"The tenth state, Old Dominion State, is Virginia.",
"Washington, the Evergreen State, was the forty-second state.",
"The thirty-fifth state, West Virginia, is called the Mountain State.",
"The Badger State, Wisconsin, was the thirtieth state.",
"The Equality State, forty-fourth in the Union, is Wyoming.",
"Mexico is not really a state of the United States"
};
```

```
                                                                    PCXTII.C
/* PROGRAM PCXTII.C

This program interacts with an Oregon Micro Systems PCX motion
   control board.  The PC's interrupt line IRQ5 is used to
   communicate between the PC and the PCX board.

This program will have to be restarted if an RS (reset) command
   is sent to the PCX board.

This program has been adapted from Oregon Micro Systems PCXI_C.C
   code (released October 2, 1989) for the special applications of
   Technology International, Inc.

Nancy Byrd, March 2, 1990.
*/ include <stdio.h>
include <dos.h>
#include <conio.h>
#include "globe.h"

#define TRUE   1
#define FALSE  0

/* PCX I/O port definitions.
 * Base I/O address is at 300H.
 */
#define DATA_REG        0x300
#define DONE_REG        0x301
#define CONTROL_REG     0x302
#define STATUS_REG      0x303

/* CONTROL and STATUS register bit definitions
 */
#define CMDERR_BIT   0x1
#define INIT_BIT     0x2
#define ENC_BIT      0x4
#define OVRT_BIT     0x8
#define DONE_BIT     0x10
#define IBF_BIT      0x20
#define TBE_BIT      0x40
#define IRQ_BIT      0x80

/* PC interrupt definitions
 */
#define ICNT         0x20    /* interrupt terminator byte for 8259 */
#define IMREG        0x21    /* interrupt mask register I/O address*/
#define ILEVEL       0x20    /* interrupt mask level 5 byte*/

/* character definitions
 */
#define CNTRL_C   3
#define CLEARD    24
#define LF        10
define CR        13 define BSIZE     1000                  /* input and output buffer size */ int  inxti, inxto, onxti, onxto;        /* buffer pointers */
char inbuf[ BSIZE ], outbuf[ BSIZE ];   /* input and output buffers */
char done_flag, error_flag;

void send_pcx( char *comm )
{
    char *c;
```

```
    /* Apply a band aid -
     *    if DOS turns interrupt off, turn it back on.
     */
    outp( IMREG, inp( IMREG ) & ~ILEVEL );

c = comm;
    while( *c != '\0' ) {
       putcm( *c );
       c++;
    }

/*
 *  This routine sends interactive keyboard entries to PCX
 *  and displays PCX output.
 */
void interact( void )
{
    int i = 0,
        go = 1,
        new_char = FALSE;
    char outchar = 0, inchar,
         comm_buf[50];

while( go && outchar != CNTRL_C )
    {
       if( outchar == CR && new_char == TRUE )
       {
          comm_buf[i-1] = '\0';
          i = 0;
          go = command_pcx( comm_buf );
       } new_char = FALSE;
       if( kbhit( ) )           /* Is char available from keyboard? */
       {
          outchar = (char) getch( );  /* Get char from keyboard. */
          comm_buf[i++] = outchar;
          new_char = TRUE;
       } if( mhit( ) )            /* Is char available from PCX? */
          inchar = getcm( );    /* Get char from PCX. */ checkstatus( );
    }
}

/*
 *  This routine decodes the PCX status and displays it's info.
 */
void checkstatus( void )
{
    extern char done_flag, error_flag;

/* If an error has been flagged, print an error message. */
    if( error_flag != 0 )
    {
       /* Check for a command error. */
       if( ( error_flag & CMDERR_BIT ) != 0 )
          printf( "\nPCX Status Register: Command Error\n" );
```

```c
      /* Check for an encoder slip error. */
      else if( ( error_flag & ENC_BIT ) != 0 )
         printf( "\nPCX Status Register: Encoder Slip Error\n" );
      /* Check whether limit switch is active. */
      else if( ( error_flag & OVRT_BIT ) != 0 )
         printf( "\nPCX Status Register: Limit Switch Closed\n" );

/* Clear error_flag. */
      error_flag = 0;
   }

/* If an ID has been encountered, print the done axis. */
   if( done_flag != 0 )
   {
      printf( "\nPCX Status Register: DONE flag set\n" );
      printf( "AXES DONE: " );
      if( done_flag % 2 == 1 )
         printf( "x " );
      done_flag /= 2;
      if( done_flag % 2 == 1 )
         printf( "y " );
      done_flag /= 2;
      if( done_flag % 2 == 1 )
         printf( "z " );
      done_flag /= 2;
      if( done_flag % 2 == 1 )
         printf( "t " );
      done_flag /= 2;
      if( done_flag % 2 == 1 )
         printf( "u " );
      done_flag /= 2;
      if( done_flag % 2 == 1 )
         printf( "v " );

/* Clear done_flag. */
      done_flag = 0;
   }
}

/*
 *  This routine returns a character input from the PCX buffer.
 */
char getcm( void )
{
   char c;

if( inxti == inxto )         /* Case where no char is available. */
      return( 0 );
   else
   {
      /* Get char at pointer. */
      c = inbuf[inxto];
      /* Increment pointer and wrap around as necessary. */
      if( ++inxto == BSIZE )
         inxto = 0;
      /* enable PCX interrupt so it can put more chars in buffer. */
      outp( CONTROL_REG, inp( CONTROL_REG ) | IBF_BIT );
      return( c );
   }
}

/*
 *  This routine puts a character into PCX output buffer.
 */
```

```c
void putcm( char c )
{
   int i, j;

/* Set local pointers from global pointer to output buffer,
    * wrapping around as necessary.
    */
   i = onxti;
   j = ( (i + 1) == BSIZE ) ? 0 : i + 1;

/* Wait until PCX interrupt routine makes room in buffer. */
   while( j == onxto )
      ;
   /* Write char to next output buffer position. */
   outbuf[i] = c;

/* Increment next output buffer position,
    * wrapping around as necessary.
    */
   if( ++i == BSIZE )
      i = 0;
   onxti = i;

/* Enable PCX interrupt so it can get chars from the buffer. */
   outp( CONTROL_REG, inp( CONTROL_REG ) | TBE_BIT );
}

/*
 * This routine returns non zero if input buffer has character.
 */
int mhit( void )
{
   return( inxto - inxti );
}

/*
 * Interrupt driven routine that communicates with PCX board.
 */
void interrupt far service( void )
{
   char c;
   int i;

/* Get the status of enabled interrupts. */
   c = (char) (inp( STATUS_REG ) & ( inp( CONTROL_REG ) | 0x0f ));

/* If the DONE bit is set: */
   if( c & DONE_BIT )
   {
      done_flag  |= inp( DONE_REG );    /* save done axis flags */
      error_flag |= ( c & 0x0f );       /* save error bits also */
      outp( DATA_REG, CLEARD );         /* reset PCX done status */
   }

/* If PCX board will accept a char: */
   else if( ( c & TBE_BIT ) == TBE_BIT )
   {
      /* If there is a char to send PCX: */
      if( onxto != onxti )
      {
         outp( DATA_REG, outbuf[onxto] ); /* Send char to PCX board. */
         if( ++onxto == BSIZE )           /* Increment pointer. */
            onxto = 0;                    /* Wrap around if necessary. */
```

```c
        /* Turn off PCX interrupt if buffer is empty,
         *  so it won't keep asking for chars.
         */
        if( onxto == onxti )
            outp( CONTROL_REG, inp( CONTROL_REG ) & -TBE_BIT );
    }
    /* If there isn't a char to send PCX: */
    else
        /* Turn off PCX interrupt so it won't keep asking for chars. */
        outp( CONTROL_REG, inp( CONTROL_REG ) & -TBE_BIT );
}

/* If PCX has a char to send the PC: */
if( ( c & IBF_BIT ) == IBF_BIT )
{
    inbuf[inxti] = (char) inp( DATA_REG );  /* Put the char in the buffer. */
    if( ++inxti == BSIZE )                   /* Increment pointer. */
        inxti = 0;                           /* Wrap around if necessary. */

/* Calculate next buffer position. */
    if( (i = inxti + 1) == BSIZE )
        i = 0;
    /* Test if there is room for another char in the buffer. */
    if( i == inxto )
        /* If not, turn off interrupt so PCX cannot send more chars. */
        outp( CONTROL_REG, inp( CONTROL_REG ) & -IBF_BIT );
}

/* Send 8259 chip a return from interrupt. */
outp( ICNT, 0x20 );

/* PC/XT/AT interrupt control is edge sensitive only.
 * The following generates a rising edge if a second interrupt
 * has occured prior to the first being reset.  This can happen
 * if more than one source is enabled on the PCX as in this program.
 */
c = (char) inp( CONTROL_REG );
outp( CONTROL_REG, c & -IRQ_BIT );      /* Turn off interrupts, */
outp( CONTROL_REG, c );                  /* and back on to create edge. */
}
/*
 *  This routine connects hardware interrupt IRQ5 to
 *  interrupt handler.
 */
void init( void (interrupt far *intvec)( ) )
{
    extern int intdosx( );
    union REGS inregs, outregs;
    struct SREGS segregs;

inregs.h.ah = 0x25;                 /* set interrupt vector DOS call */
    inregs.h.al = 13;                   /* interrupt vector level 5 */
    segregs.ds = FP_SEG( *intvec );     /* send the vector */
    inregs.x.dx = FP_OFF( *intvec );
    intdosx( &inregs, &outregs, &segregs );

/* Enable and turn on PCX interrupts. */
    outp( IMREG, inp( IMREG ) & -ILEVEL );
    outp( CONTROL_REG, IBF_BIT | DONE_BIT | IRQ_BIT );
}
```

GAEA.C

```c
#include "globe.h"
#include "common.h"

void main( void )
{
    extern int  inxti, inxto, onxti, onxto;
    extern char done_flag, error_flag;

init_graphics( );
    init_sound( );
    init_window( );

/**********************************************************************
 *   Initialize the DOS interrupt service to be used by the PCX       *
 *   motion control board, along with related flags and pointers.     *
 **********************************************************************/
    /* Initialize buffer pointers. */
    inxti = inxto = onxti = onxto = 0;
    /* Clear flags. */
    done_flag = error_flag = 0;
    /* Initialize interrupts. */
    init( service );
    send_pcx( INIT_PCX1 );
    send_pcx( INIT_PCX2 );

/**********************************************************************
 *   Wait for commands in interactive mode.                           *
 **********************************************************************/
    interact( );

prog_exit( NULL );
}

BWINDOW *main_win;
BORDER   main_bord;
WHERE    main_loc;

void init_window( void )
{
    int x1, x2, x3;
    extern ADAP_STATE display_state;

main_win = wncreate( display_state.rows - 2, display_state.columns - 2,
                         SC_BLUE*16 | SC_INTENSE_WHITE );
    if( main_win == NIL )
        prog_exit( "Error initializing main window.\n" );
    main_bord.type = BBRD_DDDD | BBRD_TCT;
    main_bord.attr = SC_BLUE*16 | SC_LIGHT_BLUE;
    main_bord.ttattr = SC_BLUE*16 | SC_YELLOW;
    main_bord.pttitle = " GAEA ";
    main_loc.corner.row = 1;
    main_loc.corner.col = 1;
    wnsetopt( main_win, WN_CUR_OFF, 1 );

main_loc.dev  = scmode( &x1, &x2, &x3 );
    main_loc.page = display_state.act_page;

if( wndsplay( main_win, &main_loc, &main_bord ) == NIL )
        prog_exit( "Error displaying main window.\n" );
} int area_of_interest = 0;

int command_pcx( char *comm )
```

```c
{
   int index;

if( !stricmp( comm, "exit" ) ) {
      send_pcx( "ma0,0 go " );
      return( STOP );
   }
   else if( !stricmp( comm, "state" ) ) {
      area_of_interest = USA;
      return( CONTINUE );
   }
   else if( !stricmp( comm, "middle east" ) ) {
      area_of_interest = MID_EAST;
      return( CONTINUE );
   }
   else if( area_of_interest == USA ) {
      index = atoi( comm );
      if( index > 0 && index < NUM_USA ) state_info( index );
      return( CONTINUE );
   }
   else if( area_of_interest == MID_EAST ) {
      mid_east_info( comm );
      return( CONTINUE );
   }
} void mid_east_info( char *rootname )
{
   char buffer[80], datafile[20],
        line[200], soundfile[20];
   int  more, line_num;
   FILE *data_fp;
   double latit, longi;

sprintf( datafile, "data\\%s.dat", rootname );
   if( (data_fp = fopen( datafile, "r" )) == NULL ) {
      sprintf( buffer, "Error opening data file: %s\n", datafile );
      prog_exit( buffer );
   } fscanf( data_fp, "%lf %lf", &longi, &latit );
   sprintf( buffer, "ma%.11f,%.11f go \0", longi, latit );
   send_pcx( buffer );

line_num = 0;
   wnscroll( 0, -1, -1, SCR_UP );
   do {
      more = fread_next_nonempty_line( data_fp, line, 200 );
      if( more == EOF ) break;
      line_num++;
      if( line_num == 1 ) wnmessage( line, 1, CLEAR );
      else                wnmessage( line, SAMELINE, NOCLEAR );
   } while( TRUE );
   fclose( data_fp );

sprintf( soundfile, "sounds\\%s1.snd", rootname );
   if( (data_fp = fopen( soundfile, "r" )) != NULL ) {
      fclose( data_fp );
      for( more=1; more <= line_num; more++ ) {
         sprintf( soundfile, "sounds\\%s%d.snd", rootname, more );
         wnsay( NULL, 0, NOCLEAR, soundfile );
      }
   }
}
```

```c
void state_info( int i )
{
    char buffer[80];
    extern double latit[NUM_USA], longi[NUM_USA];
    extern char audio[][200], video[][200];

sprintf( buffer, "ma%.11f,%.11f go \0", longi[i], latit[i] );
    send_pcx( buffer );

wnscroll( 0, -1, -1, SCR_UP );
    wnmessage( video[i], 1, CLEAR );
    fprintf( stdaux, "%s", audio[i] );
    fflush( stdaux );
}
```

What is claimed:

1. Apparatus for audio-visual display of geographic information, comprising:

voice input means for receiving vocal operating instructions specifying one of a plurality of geographic features including at least cities and countries;

storage means for storing data associated with said geographic features for retrieval, said data including at least location identifying data which specifies geographic coordinates of said geographic features;

map display means for displaying said specified geographic features, said map display means comprising a permanent visible globe displaying a fixed map of said geographic features; and highlighting means for selectively visually highlighting portions of said globe corresponding to said specified geographic features in response to control signals, where said highlighted portions of said permanent visible map display are solely determined by said control signals, said highlighting means including at least one directed light beam generator located in an interior area of said globe which selectively directs a light beam onto an interior surface of said globe which is visible at an exterior surface of said globe to highlight said specified geographic feature, and rotating means for relatively moving said globe and said light beam generator in response to said control signals to align said specified geographic feature on the exterior surface of the globe with the light beam visible thereat to highlight the specified geographic feature;

processing means connected to said voice input means, said storage means, said highlighting means and said map display means for receiving said operating instructions, processing said operating instructions, identifying the specified geographic feature, retrieving at least said location identifying data associated with said geographic feature, retrieving at least said vocal location identifying data associated with said geographic features, and generating said control signals to cause said highlighting means to highlight said geographic feature.

2. The apparatus of claim 1 wherein said permanent visible map display is a permanent world globe, the apparatus further comprising:

voice template means connected to said processing means for storing and retrieving vocal data, said vocal data including at least vocal location identifying data which specifies said geographic coordinates of said geographic features; and voice output means connected to said voice template means for vocalizing by spoken words at least portions of said vocal location identifying data of said geographic features.

3. The apparatus of claim 2 wherein said globe is a hollow shell enclosing an interior area, said shell being at least partly translucent with an interior surface and an exterior surface, and wherein said highlighting means comprises directed light beam generators located in the interior area of said globe which selectively direct light beams onto the interior surface of said globe which are visible at said exterior surface of said globe to highlight said specified geographic feature.

4. The apparatus of claim 3 further comprising rotating means for precisely rotating said globe in response to said control signals to align said specified geographic feature for viewing and highlighting.

5. The apparatus of claim 4 wherein said rotating means comprises means for rotating said globe about a plurality of different axes and tilting said directed light beam generators in the interior of said globe in response to said control signals to highlight said specified feature.

6. The apparatus of claim 5 wherein said rotating means comprises:

a first step motor to rotate said globe in degrees of longitude and fractions of degrees of longitude;

a second step motor to tilt said directed light beam generator in degrees of latitude and fractions of degrees of latitude; and control card means for actuating controls of said first and second step motors in response of said processing means to produce a desired globe alignment.

7. The apparatus of claim 3 further comprising moving means for moving said globe relative to said light beam to highlight different locations thereon.

8. The apparatus of claim 3 wherein a plurality of light beam generators are located in the interior of said globe, said light beam generators highlighting differently sized areas of said exterior surface.

9. The apparatus of claim 8 wherein said light beam generators comprise:

a general light generator for continuously illuminating the overall surface of said globe;

a regional light generator which selectively illuminates a specific region of said globe; and a spot light generator which selectively illuminates a particular location on said globe smaller than that illuminated by said regional light generator.

10. The apparatus of claim 2 wherein said processing means further comprises a microcomputer means connected to said input means, said storage means, said map display means, and output means for viewing and editing data associated with said geographic feature, presenting voice output information associated with said geographic feature, and displaying and manipulating software stored in said storage means, wherein said software contains programs and processing instructions for operating said processing means.

11. The apparatus of claim 1 wherein said directed light beam generator directs a noncoherent light beam for highlighting said specified geographic features.

12. The apparatus of claim 1 wherein said voice input means comprises a microphone and a programmable voice recognition circuit connected to said processing means to provide signals to said processing means representative of said operating instructions, said operating instructions further comprising each of said plurality of predetermined geographic features displayed on various said permanent visible map displays.

13. The apparatus of claim 1 wherein said processing means comprises expert system software comprising rules of inference and artificial intelligence algorithms, said processing means executing said rules of inference to contextually identifying said specified geographic feature when the operating instructions received by said voice input means do not unambiguously identify said geographic feature and when said operating instructions do not give a predetermined command sequence.

14. The apparatus of claim 1 wherein said location identifying data includes the degrees of latitude and longitude of said geographic features.

15. The apparatus of claim 1 further comprising output means for displaying additional information related to said geographic feature stored in said storage means, said additional information comprising information not displayed on said map display means.

16. The apparatus of claim 15 wherein said storage means comprises a video tape player and said output means comprises a video screen, whereby images related to said geographic feature are displayed as said feature is highlighted.

17. The apparatus of claim 15 wherein said storage means comprises one or more slides and said output means comprises a slide projection system, whereby images related to said geographic feature are displayed as said feature is highlighted.

18. The apparatus of claim 15 wherein said storage means stores specific words related to said geographic feature and said output means comprises a loudspeaker connected to a sound board and a voice synthesizer, said voice synthesizer connected to said processing means, the processing means operating to retrieve specific words related to a specific geographic feature and to control said voice synthesizer to produce a verbal output of said words on said loudspeaker as said geographic feature is highlighted.

19. The apparatus of claim 15 wherein said storage means stores screen display images of said additional information and said output means comprises a means for displaying screen display images, whereby said screen display images related to said geographic feature are displayed as said geographic feature is highlighted.

20. The apparatus of claim 19 wherein said means for displaying screen display images comprises a computer monitor displaying said additional information related to said geographic feature.

21. The apparatus of claim 19 wherein said means for displaying screen display images comprises a controllable overhead projector display device.

22. The apparatus of claim 1 wherein the storage means further comprises means for storing a specific single point location on the permanently visible map display where said specific single point location is associated with the geographic feature, and said highlighting means comprises means for illuminating said specific single point location in response to the control signals generated by said processing means.

23. The apparatus of claim 1 wherein the input means, storage means, map display means, output means, power supply means, and processing means are incorporated in a standalone unit with no physical connection to external processing devices.

24. The apparatus of claim 1 wherein said permanent visible map display is visible when the apparatus is deactivated.

25. A method for computer-aided voice interactive learning of geography using an automatic system including a microprocessor, a storage component, a retrieval component, a display component including a permanent map display, and a speech recognition circuit with a microphone for voice input, comprising the steps of:

storing geographic information using the storage component, said geographic information relating to a plurality of specific geographic features and including, for each such specific feature, location information and one or more stored key words identifying said specific geographic feature;

electronically receiving a command from an operator in the form of a voice input using the microphone, said command including one or more spoken key words;

using said speech recognition circuit, electronically processing said voice input to identify said one or more spoken key words;

electronically comparing said spoken key words to said one or more stored key words to identify a commanded geographic feature having stored key words corresponding to the spoken key words;

electronically extracting the stored geographic information relating to the commanded geographic feature using the retrieval component;

providing at least one directed light beam generator located in an interior area of said permanent map display which selectively directs a light beam onto an interior surface of said permanent map display which is visible at an exterior surface of said permanent map display to highlight said specified geographic feature;

electronically controlling the display component to physically highlight the commanded geographic feature identified by the one or more spoken key words, on the permanent map display, by relatively moving said permanent map display and said light beam generator in response to said control signals to align said specified geographic feature on the exterior surface of the permanent map display with the light beam visible thereat to highlight the specified geographic feature.

26. The method of claim 25 wherein the location information stored includes degrees of latitude and longitude of the geographic feature, and further including the steps of:

constructing inference rules associating geographic features with said geographic information and storing the inference rules on the storage component; and applying said stored inference rules in the step of electronically extracting stored geographic information relating to the commanded geographic feature to infer the coordinates of said specified geographic feature from neighboring geographic features.

27. The method of claim 25 further including the step of constructing a knowledge base including additional information on said geographic features, and extracting said additional information from the knowledge base as an output during the step of highlighting of said geographic feature.

28. The method of claim 27 wherein said knowledge base includes digital graphic data relevant to said geographic features, said digital graphic data obtained from a video input or a scanner input, whereby relevant digital graphic data are displayed during highlighting of said geographic feature.

29. The method of claim 27 wherein said knowledge base includes vocal data and the vocal data is used to generate a synthesized speech output providing information relevant to the geographic feature during highlighting thereof.

30. The method of claim 29 wherein said speech output is provided on a loudspeaker while the information conveyed by the speech output is contemporaneously displayed on a visual display.

31. The method of claim 25 further including the steps of:

displaying the identification of the commanded geographic feature to the operator for verification prior to highlighting the commanded geographic feature; and verifying correctness of the geographic feature identification displayed to the operator by a predetermined input before highlighting the geographic feature.

32. The method of claim 25, wherein the voice input is a voice input of a type selected from the group consisting of: a location identifier, and an inquiry about a location related to a geographic feature of interest to the operator.

33. The method of claim 22 including the further step of training the speech recognition circuit to recognize said key words.

34. The apparatus of claim 33 wherein said input means further comprises:

keyboard input means for entering geographic information including a plurality of said predetermined geographic features for storage in said storage means, and for entering operating commands for operation of said processing means; and scanner means for scanning geographic information related to said geographic feature and storing said geographic information on said storage means.

35. Apparatus for audio-visual display of geographic information, comprising:

input means for receiving operating instructions specifying one of a plurality of geographic features;

storage means for storing data associated with said geographic features for retrieval, said data including at least location identifying data which specifies geographic coordinates of said geographic features;

map display means for displaying and highlighting said specified geographic features, said map display means comprising a permanent visible map display with a display surface;

highlighting means associated with said map display means for selectively visually highlighting a coordinate location anywhere on said display surface by controlling relative movement between the display surface and a light beam generator aimed at the display surface in direct response to a control signal specifying said geographic coordinates of said geographic feature to be highlighted on the permanent visible map display;

processing means connected to said input means, said storage means, and said highlighting means for receiving said operating instructions, processing said operating instructions, identifying the specified geographic feature, retrieving at least said location identifying data associated with said geographic feature, and generating said control signals to cause said map display means to highlight said coordinate location.

* * * * *